(12) United States Patent
Grosskopf et al.

(10) Patent No.: US 6,361,010 B1
(45) Date of Patent: Mar. 26, 2002

(54) HANGER LABEL

(75) Inventors: Glenn A. Grosskopf, Lake Zurich, IL (US); Carl W. Treleaven, Greensboro, NC (US)

(73) Assignee: Pharmagraphics (Southeast), L.L.C., Greensboro, NC (US)

( * ) Notice: Subject to any disclaimer, the term of this patent is extended or adjusted under 35 U.S.C. 154(b) by 0 days.

(21) Appl. No.: 09/631,129

(22) Filed: Aug. 2, 2000

Related U.S. Application Data
(60) Provisional application No. 60/165,949, filed on Nov. 17, 1999, and provisional application No. 60/147,588, filed on Aug. 6, 1999.

(51) Int. Cl.$^7$ ................................................. A47K 1/08
(52) U.S. Cl. ........................... 248/311.2; 248/311.3; 248/205.3; 215/399
(58) Field of Search ........................... 248/311.2, 683, 248/311.3, 205.3; 40/310, 630, 617, 622, 907; 215/399; 239/81; 283/81, 79, 80

(56) References Cited

U.S. PATENT DOCUMENTS

| | | | |
|---|---|---|---|
| 2,135,236 A | 11/1938 | Koppelman | ................ 229/90 |
| 2,196,323 A | * 4/1940 | Norton et al. | ............... 128/214 |
| 2,362,523 A | 11/1944 | Armstrong, Jr. et al. | ........ 215/1 |

(List continued on next page.)

FOREIGN PATENT DOCUMENTS

| | | | |
|---|---|---|---|
| DE | 408 315 | 11/1966 | |
| DE | 28 06 391 A1 | 8/1978 | |
| DE | 3631-021 A | 3/1988 | ............. G09F/3/02 |
| DE | 43 21 572 A1 | 1/1995 | ............. G09F/3/02 |
| EP | 0 390 952 B1 | 6/1994 | ............. G09F/3/02 |
| EP | 0 356 574 B1 | 11/1994 | ............. G09F/3/02 |
| FR | 1 460 738 | 10/1966 | |
| GB | 1175296 | 12/1969 | ............. A47F/5/00 |
| GB | 1309950 | 3/1973 | ............. F16L/3/02 |

Primary Examiner—Kimberly T. Wood
(74) Attorney, Agent, or Firm—Myers Bigel Sibley & Sajovec

(57) ABSTRACT

A label for suspending an article from a support has a lower surface and includes an adhesive on the lower surface to secure the label to the article. The label further includes a hanger defining an opening therein and an interlock receiving portion having an interlock opening defined therein. An interlock tab is adapted to selectively engage the interlock opening to interlock with the interlock receiving portion to form a hanging loop.

23 Claims, 28 Drawing Sheets

U.S. PATENT DOCUMENTS

| | | | | |
|---|---|---|---|---|
| 2,422,314 A | * | 6/1947 | Rheinstrom | 206/47 |
| 2,635,604 A | | 4/1953 | Fredrickson | 128/272 |
| 3,231,919 A | | 2/1966 | MacDonald | 15/174 |
| 3,387,732 A | | 6/1968 | Jellies | 215/100 |
| 3,395,882 A | * | 8/1968 | Marshall | 248/318 |
| 3,402,910 A | | 9/1968 | Purvis | 248/318 |
| 3,623,633 A | | 11/1971 | Kinn | 220/94 R |
| 3,635,367 A | | 1/1972 | Morita et al. | 215/100 A |
| 3,744,658 A | | 7/1973 | Fujio | 215/100 A |
| 3,851,790 A | | 12/1974 | Kasper | 220/85 R |
| 3,869,333 A | | 3/1975 | McMaster | 161/39 |
| 3,884,443 A | | 5/1975 | McMaster | 248/467 |
| 3,931,948 A | * | 1/1976 | Mason, Jr. | 248/318 |
| 4,306,662 A | | 12/1981 | Sciortino et al. | 215/399 |
| 4,396,128 A | | 8/1983 | Larson et al. | 215/399 |
| 4,460,143 A | | 7/1984 | Ohama | 248/359 |
| 4,462,538 A | | 7/1984 | Gendron | 229/68 R |
| 4,479,838 A | | 10/1984 | Dunsirn et al. | 156/247 |
| 4,539,766 A | | 9/1985 | Fast | 40/22 |
| 4,779,367 A | | 10/1988 | Fast | 40/657 |
| 4,796,937 A | | 1/1989 | Andrea | 294/31 |
| 4,832,301 A | | 5/1989 | Hiramoto et al. | 248/359 |
| 4,847,130 A | | 7/1989 | Cooper | 428/40 |
| 4,948,000 A | | 8/1990 | Grabenkort | 215/12.2 |
| 5,135,125 A | | 8/1992 | Andel et al. | 215/100 |
| 5,238,720 A | | 8/1993 | Volkman | 428/40 |
| 5,290,083 A | | 3/1994 | Rissley | 294/87.2 |
| 5,350,612 A | | 9/1994 | Stern et al. | 428/40 |
| 5,389,415 A | * | 2/1995 | Kaufmann | 428/40 |
| 5,417,365 A | | 5/1995 | Lindsay | 229/117 |
| 5,490,658 A | | 2/1996 | Coward et al. | 248/683 |
| 5,542,634 A | | 8/1996 | Pomerantz | 248/214 |
| 5,738,381 A | | 4/1998 | Treleaven et al. | 283/81 |
| 5,782,495 A | | 7/1998 | Grosskopf et al. | 281/81 |
| 5,823,503 A | | 10/1998 | Wasserman | 248/683 |
| 5,829,788 A | | 11/1998 | Jackson | 283/81 |
| 5,878,901 A | | 3/1999 | Grosskopf et al. | 215/399 |
| 6,015,470 A | | 1/2000 | Treleaven et al. | 156/267 |
| 6,296,223 B1 | * | 10/2001 | Groffkopf | 248/683 |

* cited by examiner

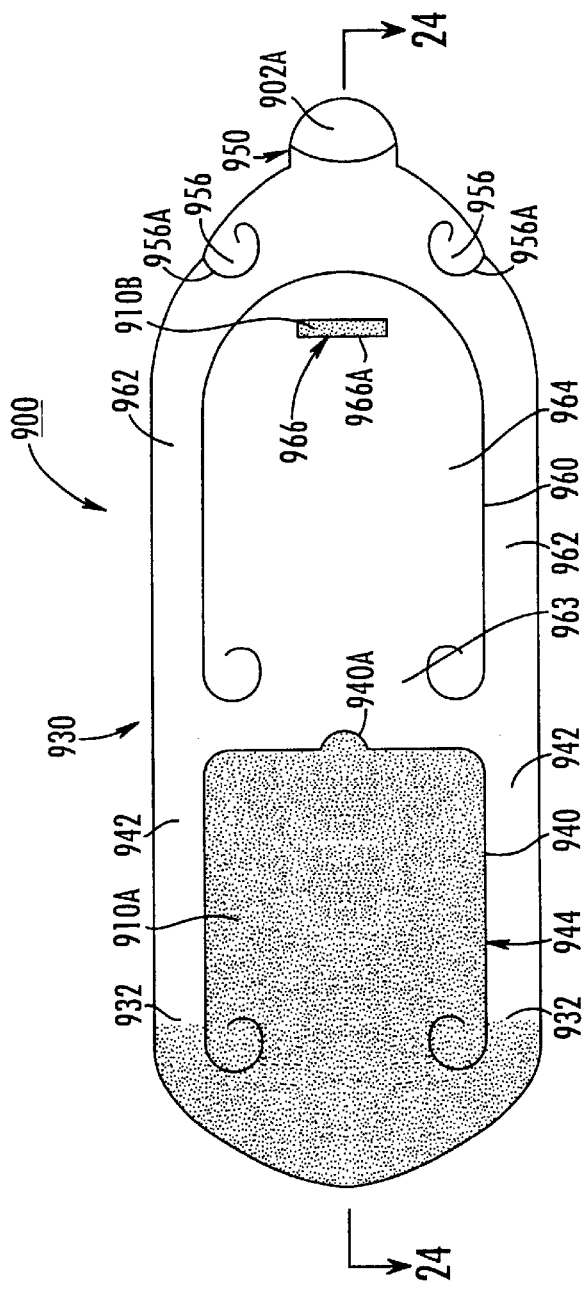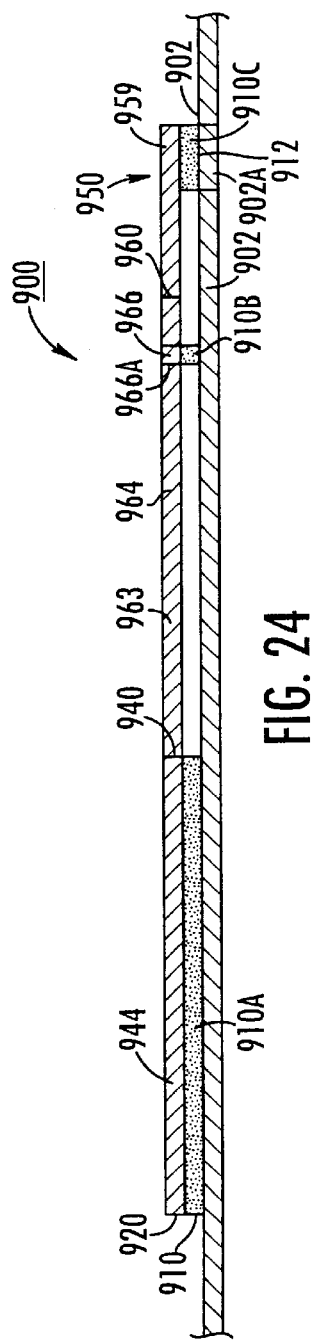

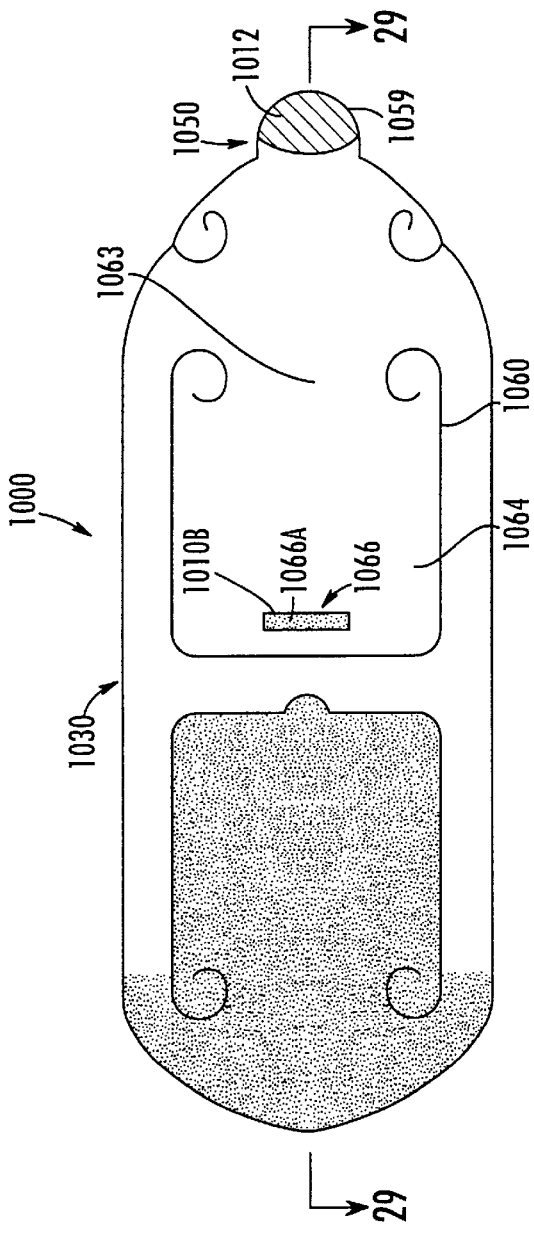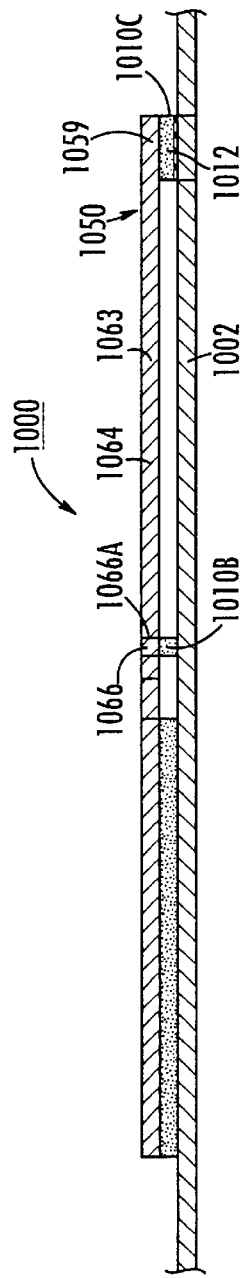
FIG. 28
FIG. 29

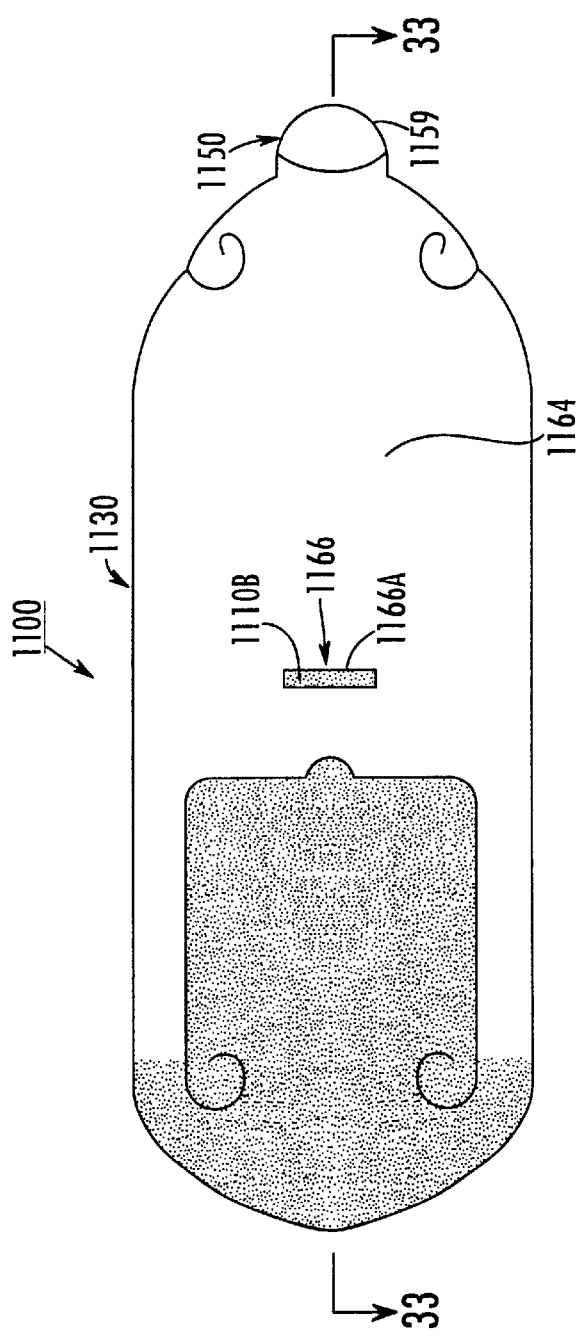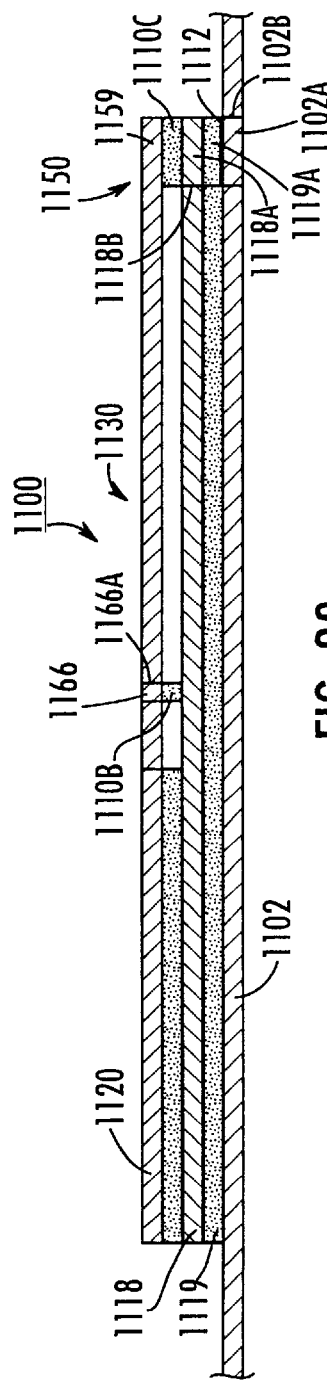
FIG. 32
FIG. 33

HANGER LABEL

RELATED APPLICATIONS

This application claims the benefit of U.S. Provisional Application No. 60/147,588, filed Aug. 6, 1999 and the benefit of U.S. Provisional Application No. 60/165,949, filed Nov. 17, 1999, the disclosures of which are incorporated herein by reference in their entireties.

FIELD OF THE INVENTION

The present invention relates to devices for suspending articles, and more particularly, to labels including hangers and securable to articles.

BACKGROUND OF THE INVENTION

It is often necessary or desirable to hang various articles from supports for storage and convenient access. For example, IV bottles and bags often must be suspended from stands for gravitational feed of the contents of the bottles or bags. Similarly, consumers often wish to hang bottles of shampoo, soap, suspension oils and the like in their showers or elsewhere. A number of hanging devices for such purposes have been proposed, including self-adhesive labels including integral hangers. See, for example, U.S. Pat. No. 5,135,125 to Andel et al. Additionally, some hanger devices are mechanically secured to an article, such as in the container and retractable hanger system disclosed in U.S. Pat. No. 5,749,497 to Davis.

It is desirable to minimize the cost of any such hanger, particularly in the case of relatively low cost consumer products such as shampoos and the like. However, it is also desirable to provide a hanger which will reliably suspend the article. In the case of hangers consisting of an open hook, there is the risk that the hanger will become dislodged from a support through the open portion of the hook. While closed loop hangers may obviate this risk, they limit the choice of supports to those having a free end over which the hanger may be looped. Commonly, consumers have a number of items in their shower which they wish to hang, but only a few suitable supports for closed loop hangers. Notably, a support having a free end (e.g., a showerhead) presents a risk that the hanger may fall off the support.

SUMMARY OF THE INVENTION

The present invention is directed to a label for suspending an article from a support. The label has a lower surface and includes an adhesive on the lower surface to secure the label to the article. The label further includes a hanger defining an opening therein and an interlock receiving portion. The interlock receiving portion has an interlock opening defined therein. An interlock tab is adapted to selectively engage the interlock opening to interlock with the interlock receiving portion to form a hanging loop.

According to preferred embodiments of the present invention, the label as described above may include first and second opposed label ends and an intermediate region disposed between and spaced apart from the first and second label ends. The label includes an anchoring portion disposed adjacent the first label end and having a lower surface. The adhesive is disposed on the lower surface of the anchoring portion. The hanger includes at least one primary leg having a leg end adjoining the anchoring portion and extending toward the second label end. The at least one primary leg defines the hanger opening and is foldable about the leg end. The hanger also includes a pair of opposed secondary legs each having a leg end adjacent the intermediate region and extending toward the second label end. The secondary legs define a secondary opening therebetween. The interlock receiving portion includes an interlock flap forming a part of the hanger and disposed within the secondary opening. The interlock flap is foldable about a flap end adjacent the intermediate region and includes the interlock opening defined therein adjacent the second label end. The interlock tab is integral with the secondary legs. The hanging loop includes the interlock flap and the secondary legs. Preferably, the at least one primary leg includes a pair of primary legs foldable about respective leg ends and defining the hanger opening therebetween.

According to other preferred embodiments, the label as first described above may include first and second opposed label ends and an intermediate region disposed between and spaced apart from the first and second label ends. The label includes an anchoring portion disposed adjacent the first label end and having a lower surface. The adhesive is disposed on the lower surface of the anchoring portion. The hanger includes at least one primary leg having a leg end adjoining the anchoring portion and extending toward the second label end. The at least one primary leg defines the hanger opening therebetween and is foldable about the leg end. The hanger also includes a pair of opposed secondary legs each having a leg end adjacent the intermediate region and extending toward the second label end. The secondary legs define a secondary opening therebetween. The interlock receiving portion includes an interlock flap forming a part of the hanger and disposed within the secondary opening. The interlock flap is foldable about a flap end adjacent the second label end and includes the interlock opening defined therein adjacent the intermediate region. The interlock tab is integral with the secondary legs. The hanging loop includes the interlock flap. Preferably, the at least one primary leg includes a pair of primary legs foldable about respective leg ends and defining the hanger opening therebetween.

According to further preferred embodiments of the present invention, the label as first described above may include first and second opposed label ends and an anchoring portion disposed adjacent the first label end and having a lower surface. The adhesive is disposed on the lower surface of the anchoring portion. The hanger includes at least one primary leg having a leg end adjoining the anchoring portion and extending toward the second label end. The at least one primary leg defines the hanger opening and is foldable about the leg end. The interlock receiving portion includes a body portion forming a part of the hanger and disposed between the primary opening and the second label end. The body portion includes the interlock opening defined therein and spaced apart from the second label end. The interlock tab is integral with the body portion. The hanging loop includes the body portion. Preferably, the at least one primary leg includes a pair of primary legs foldable about respective leg ends and defining the hanger opening therebetween.

According to preferred embodiments of the present invention, the label as first described above may include first and second opposed label ends and an intermediate region disposed between and spaced apart from the first and second label ends. The label includes an anchoring portion disposed adjacent the first label end and having a lower surface. The adhesive is disposed on the lower surface of the anchoring portion. The hanger includes at least one primary leg having a leg end adjoining the anchoring portion and extending toward the second label end. The at least one primary leg defines the hanger opening therebetween and is foldable about the leg end. The hanger also includes a pair of opposed secondary legs each having a leg end adjacent the intermediate region and extending toward the second label end. The secondary legs define a secondary opening therebetween. The interlock receiving portion includes a connecting portion forming a part of the hanger and connecting the primary legs. The connecting portion is disposed between the primary and secondary openings and adjacent the intermediate region and includes the interlock opening defined therein. The interlock tab is integral with the secondary legs. The hanging loop includes the connecting portion and the secondary legs. Preferably, the at least one primary leg includes a pair of primary legs foldable about respective leg ends and defining the hanger opening therebetween.

According to preferred embodiments of the present invention, the label as first described above may include first and second opposed label ends and an anchoring portion having a lower surface. The adhesive is disposed on the lower surface of the anchoring portion. The hanger includes a pair of opposed legs each having a leg end adjoining the anchoring portion and extending between the first and second label ends. The legs defme the hanger opening therebetween and are foldable about the respective leg ends. The interlock receiving portion includes an interlock flap disposed between the legs. The interlock flap has a first flap end adjoining the anchoring portion and an opposing second, free flap end. The interlock flap includes the interlock opening defined therein and is spaced apart from the second flap end. The interlock tab is integral with the interlock flap and is located on the second flap end. The hanging loop includes the interlock flap.

The present invention is further directed to a suspendable assembly including an article and a label having a lower surface. The label includes: an adhesive on the lower surface securing the label to the article; a hanger defining a hanger opening therein; an interlock receiving portion having an interlock opening defined therein, and an interlock tab adapted to selectively engage the interlock opening to interlock with the interlock receiving portion to form a hanging loop.

The present invention is further directed to a method for suspending an article from a support as follows. A label is secured to the article by an adhesive. The label includes: a hanger defining a hanger opening therein; an interlock receiving portion having an interlock opening defined therein; and an interlock tab. The interlock tab is interlocked with the interlock opening to form a closed hanging loop extending about the support and to the article.

The present invention is further directed to a label for suspending an article from a support. The label includes first and second opposed label ends and an intermediate region disposed between and spaced apart from the first and second label ends. The label has an anchoring portion having a lower surface. An adhesive is disposed on the lower surface of the anchoring portion. The label further includes a first hanging flap, a second hanging flap and an interlock tab. The first hanging flap has a first flap end adjoining the anchoring portion adjacent the first label end and a second, free flap end disposed adjacent the intermediate region. The first hanging flap is foldable about the first flap end thereof and includes an interlock opening defined therein. The second hanging flap has a first flap end adjoining the anchoring portion adjacent the second label end and a second, free flap end disposed adjacent the intermediate region. The second hanging flap is foldable about the first flap end thereof. The interlock tab is integral with the second hanging flap. The interlock tab is adapted to selectively engage the interlock opening to interlock with the first hanging flap to form a hanging loop including the first and second hanging flaps.

The foregoing label may include a second opening defined in the second hanging flap, the interlock opening and the second opening being adapted to simultaneously receive the support. The label may include a pair of opposed supplemental flaps extending from the first hanging flap toward the second label end and a supplemental interlock opening defined in each of the supplemental flaps, the supplemental interlock openings adapted to interlock with the interlock tab. A hanging strip may be disposed between the first and second hanging flaps, the hanging strip defining an opening and including a pair of opposed ends adjoining the anchoring portion.

According to preferred methods of the present invention for suspending an article from a support, the anchoring portion of a label as described above may be secured to the article using the adhesive. The first and second hanging flaps are folded away from the article. The interlock tab is interlocked with the interlock opening to form a closed hanging loop extending about the support and to the article, the hanging loop including the first and second hanging flaps.

The present invention is further directed to a label as follows, the label includes first and second opposed label ends and an intermediate region disposed between and spaced apart from the first and second label ends. The label has an anchoring portion having a lower surface and an adhesive disposed on the lower surface of the anchoring portion. The label further includes first and second flaps and a pair of opposed interlock extensions. The first flap has a first flap end adjoining the anchoring portion adjacent the intermediate region and a second, free flap end disposed adjacent the first label end. The first flap is foldable about the first flap end thereof and includes an interlock opening defined therein. The second flap has a first flap end adjoining the anchoring portion adjacent the intermediate region and a second, free flap end disposed adjacent the second label end. The second flap is foldable about the first flap end thereof. The interlock extensions are integral with the second flap and are adapted to selectively engage the interlock opening to interlock with the first flap to form a loop including the first and second flaps.

According to preferred methods of the present invention for suspending an article from a support or securing an elongate object to the article, the anchoring portion of a label as described above may be secured to the article using the adhesive. The first and second hanging flaps are folded away from the article. The interlock tab is interlocked with the interlock opening to form a closed loop extending about the support or elongate object and to the article, the loop including the first and second hanging flaps.

Objects of the present invention will be appreciated by those of ordinary skill in the art from a reading of the Figures and the detailed description of the preferred embodiments which follow, such description being merely illustrative of the present invention.

BRIEF DESCRIPTION OF THE DRAWINGS

FIG. 16, is a perspective view of the label of FIG. 10 and the interlock tab member of FIG. 11 mounted on the article and disposed in the second hanging position of FIG. 15, wherein FIG. 16 and FIG. 15 show opposed sides of the article;

FIG. 23 is a bottom plan view of a label according to a further embodiment of the present invention, FIG. 24 is a cross-sectional view of the label of FIG. 23 taken along the line 24—24 of FIG. 23 and wherein the label is mounted on a release liner;

FIG. 28 is a bottom plan view of a label according to a further embodiment of the present invention;

FIG. 29 is a cross-sectional view of the label of FIG. 28 taken along the line 29—29 of FIG. 28 and wherein the label is mounted on a release liner;

FIG. 32 is a bottom plan view of a label according to a further embodiment of the present invention;

FIG. 33 is a cross-sectional view of the label of FIG. 32 taken along the line 33—33 of FIG. 32 and wherein the label is mounted on a release liner;

DETAILED DESCRIPTION OF THE PREFERRED EMBODIMENTS

Figure 1:
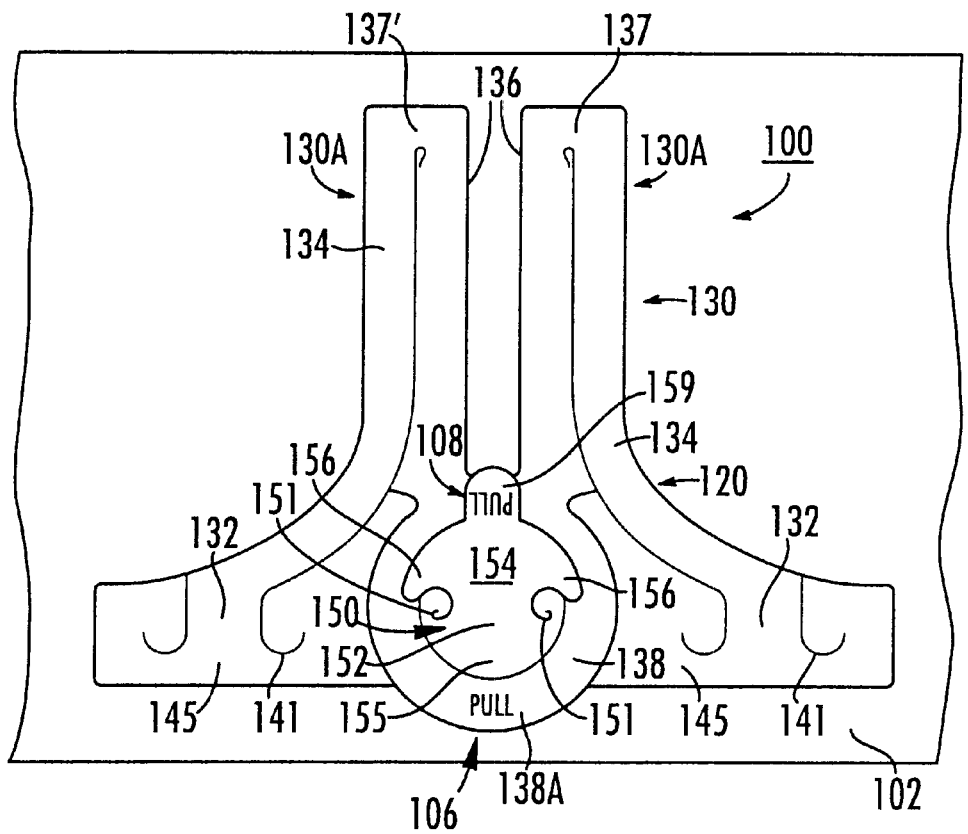
FIG. 1 is a top plan view of a label according to a first embodiment disposed on a release liner.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The thicknesses of layers of the labels as shown in the drawings may be exaggerated for clarity.

The term "label" as used herein includes elements or pieces which may be affixed to articles and which may or may not include indicia, including identifying or descriptive indicia, thereon.

Figure 2:
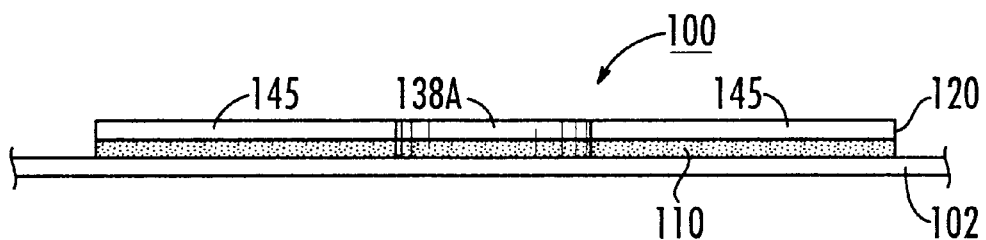
FIG. 2 is a side elevational view of the label of FIG. 1 on the release liner.
Figure 5:
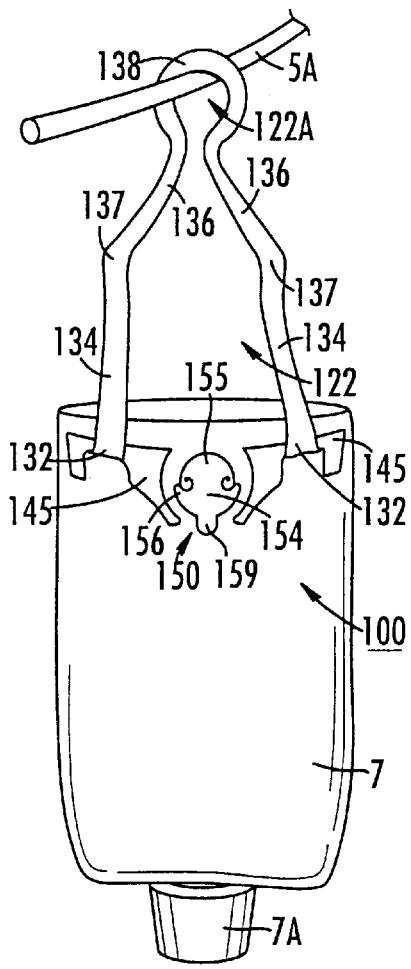
FIG. 5 is a perspective view of the label of FIG. 1 mounted on the article and disposed in a first hanging position.
Figure 6:
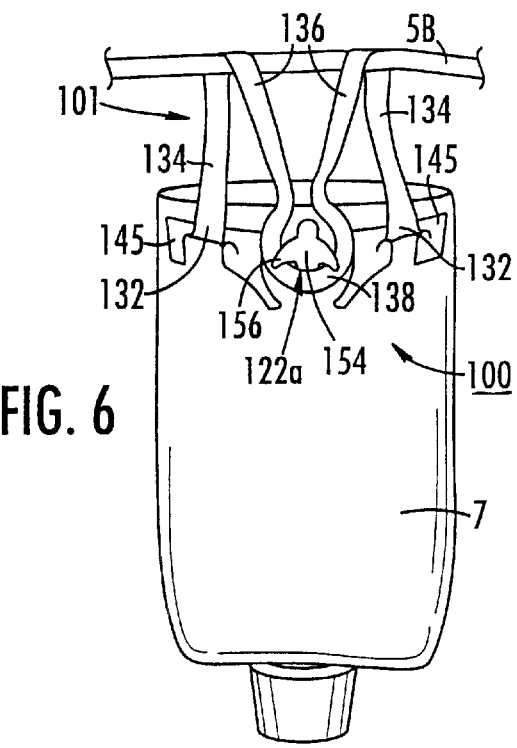
FIG. 6 is a perspective view of the label of FIG. 1 mounted on the article and in a second, alternative hanging position.

With reference to FIGS. 1 and 2, a label 100 according to the present invention is shown therein mounted on a release liner 102. The label includes a suspension layer 120 with a pressure sensitive adhesive 110 on the rear surface thereof (see FIG. 2). The suspension layer 120 includes generally an anchoring portion 145, a hanger 130, and an interlock tab portion 150 (including an anchoring portion 155 and an interlock tab 154). The suspension layer 120 is formed of a continuous layer of material with diecuts formed therein defining the foregoing elements. As will be more fully appreciated by the description that follows, the label 100 may be secured to an article 7 and suspended from a chosen support in either of two different configurations as shown in FIGS. 5 and 6. These different configurations provide the user with substantial versatility in using the label and positioning the article.

Turning to the label 100 in more detail, the hanger 130 includes legs 130A. The legs include segments 134 extending from opposed ends 132. The segments 134 are joined to segments 136 at corners 137. A loop 138 joins the ends of the segments 136. In this manner, the hanger 130 forms a continuous, closed loop from one end 132 to the other end 132. The ends 132 are integral with the anchoring portions 145. The anchoring portions 145 include all of the parts of the suspension layer 120 other than the hanger 130 and the interlock tab portion 150. Diecut stress relief curves 141 are formed at the ends 132. The loop 138 has a pull tab 138A. Indicia 106 instructing a user to "pull" the loop 138 is printed on the pull tab 138A. The suspension layer 120 is formed of a flexible material, and preferably, a flexible film such as a polyethylene or polyester film. Suitable materials for the suspension layer 120 include VALTUFF™ 4 mil polyethylene film and VALEX™ 2.5 mil polyethylene film, both available from Van Leer Films of Houston, Tex.

The interlock tab 154 of the portion 150 has an end 152 integral with the anchoring portion 155. Diecut stress relief curves 151 are formed at the end 152. Integral extensions 156 extend outwardly from the interlock tab 154. A pull tab 159 extends from the interlock tab 154 and has indicia 108 instructing the user to "pull" the pull tab. The tab portion 150 is preferably formed of the same materials as described above for the suspension layer 120.

Figure 3:
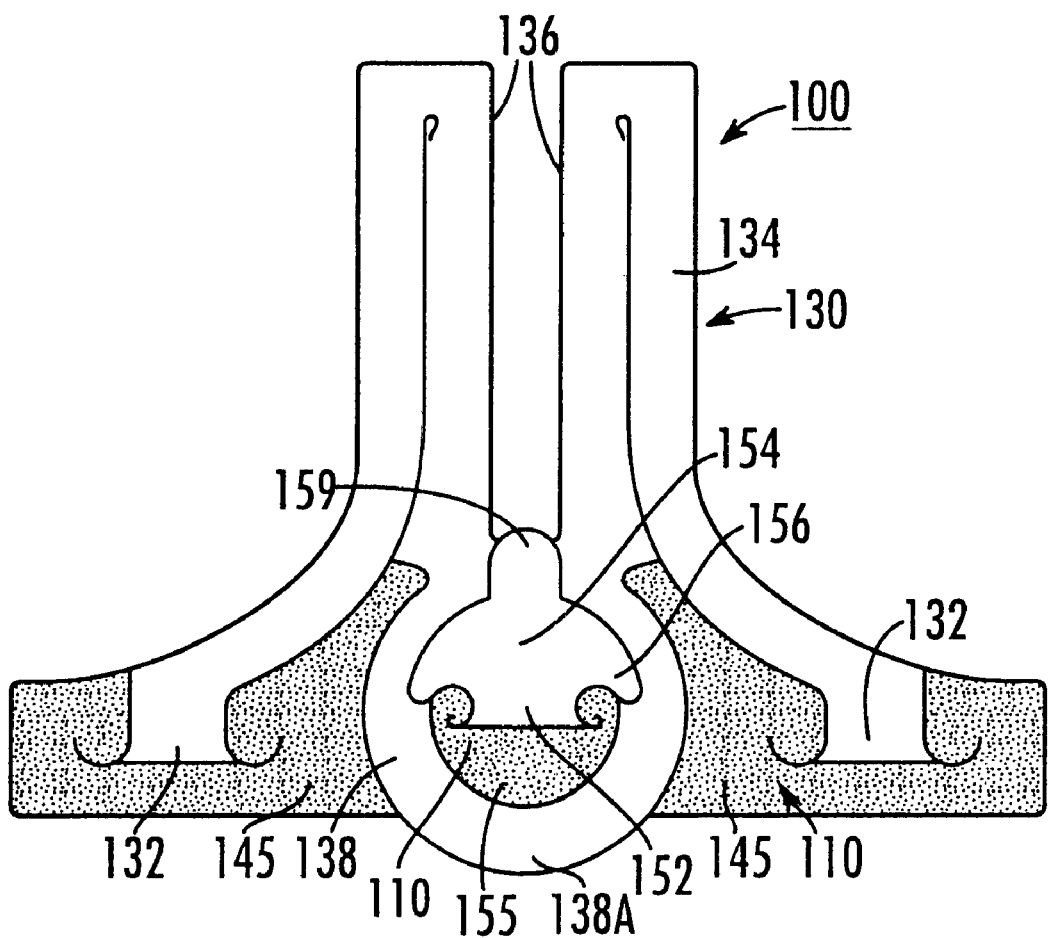
FIG. 3 is a bottom plan view of the label of FIG. 1.

The adhesive 110 coats only a portion of the lower surface of the suspension layer 120. In particular, as shown in FIG. 3, the adhesive 110 coats only the lower surfaces of the anchoring portions 145, 155. Accordingly, the suspension layer 120 may be pivoted away from the remainder of the label 100 about the ends 132, and the tab 154 may be pivoted about the end 152. The adhesive 110 is preferably a pressure sensitive adhesive. The adhesive may also be a heat activatable adhesive. Suitable adhesives include S-300™ adhesive available from Fasson of Painesville, Ohio.

Figure 4:
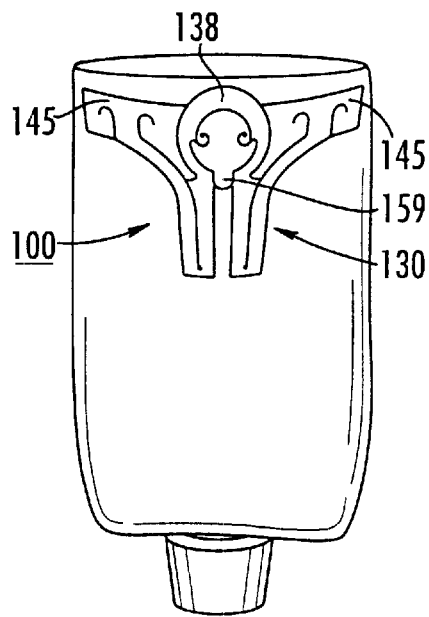
FIG. 4 is a perspective view of the label of FIG. 1 mounted on an article and in a stored positions.

In use, the label 100 may be removed from the release liner 102 and applied to an article 7, using automatic labeling equipment, for example. The anchoring portions 145, 155 are adhered to the article 7 by the adhesive 110. For illustrative purposes, the article 7 is a bottle with an end cap 7A. The label 100 may be used with articles of other types and may be oriented differently with respect to the article, depending on the application. When initially applied to the article 7, the label 100 is arranged as shown in FIG. 4 with the hanger 130 and the interlock tab 154 in a stored position against the article 7.

The manner of further use will depend on the type of support from which the user wishes to hang the article 7. If the user intends to hang the article 7 from a support 5A having a free end, such as a shower head, the user pulls the pull tab 138A (see FIG. 1) up and away from the article 7 about the ends 132, thereby unraveling the segments 134, 136. Once unfolded, the hanger 130 defines an opening 122 including a loop opening 122A in the loop 138. The loop 138 is placed over the support 5A to hang the article 7. In this usage, the interlock tab 154 preferably is not deployed.

Alternatively, and with reference to FIG. 6, the label 100 may be used to hang the article 7 from a support 5B of the type not having a free end, such as a towel rack having a wall mount bracket on either end thereof. In this case, the user pulls up the hanger 130 in the same manner as described above. Additionally, the user grasps the pull tab 159 and lifts the interlock tab 154 such that the interlock tab 154 is folded about the end 152. The hanger 130 is then looped over the support 5B and the loop 138 is looped about the interlock tab 154 so that the interlock tab 154 is received in the loop opening 122A. The loop 138 engages the extensions 156 as shown to form an interlock which is maintained by the weight of the article 7. In this manner, the hanger 130 and the interlock tab 154 form a hanging loop 101.

The hanging method and configuration as described above with regard to FIG. 6 may also be used to hang the article 7 from a support such as the support 5A having a free end. Such use may be beneficial where a shorter hanging length is desired. Such use may also be desired when greater resistance to swinging of the article 7 is desired.

From the foregoing, it will be appreciated that the folded configuration of the segments 134, 136 allows for a relatively small footprint label when the hanger is in the stored position while providing a relatively long hanger when deployed. However, it is also contemplated that the legs may consist of single segment legs or that a single leg having an eyelet formed therein may be used.

Figure 7:
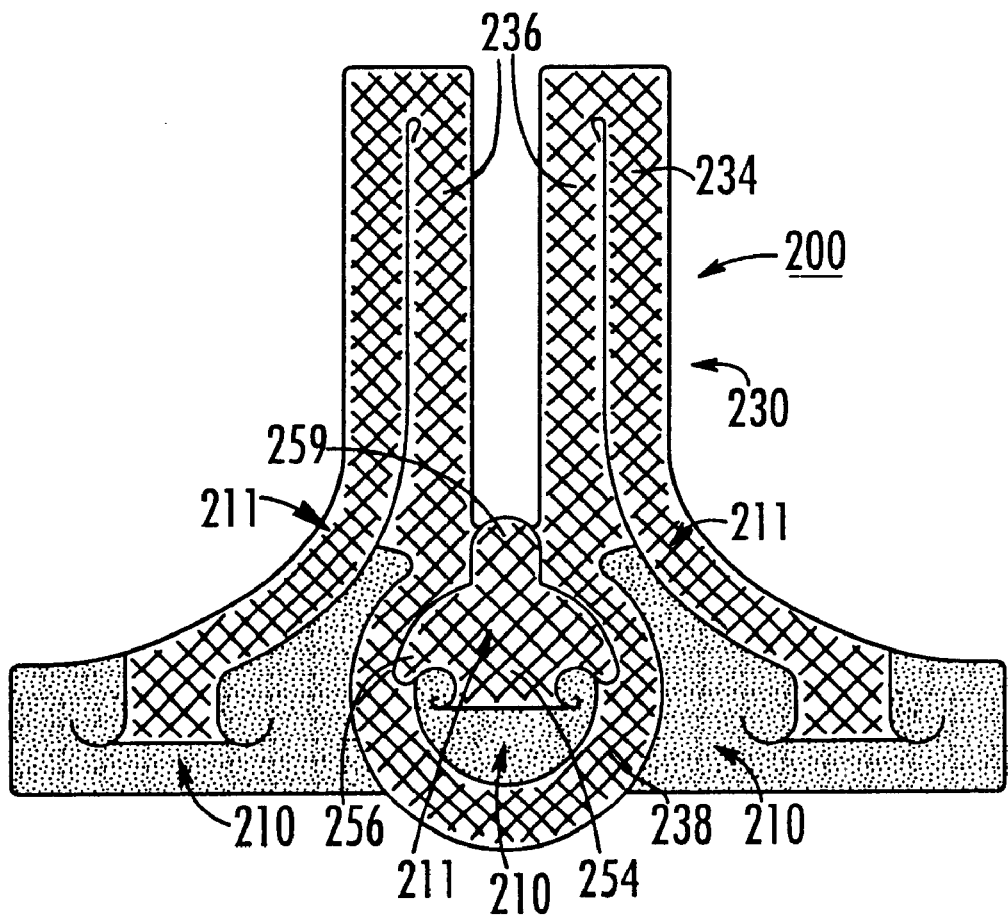
FIG. 7 is a bottom plan view of a label according to a further embodiment.

With reference to FIG. 7, a rear view of a label 200 according to a further embodiment is shown therein. The label 200 corresponds to the label 100 except as follows. Rather than being free of adhesive, the underside of the hanger 230 (i.e., the leg segments 234, 236 and the loop 238) is coated with an adhesive deadener so that a deadened adhesive 211 is presented on the underside. Suitable adhesive deadeners include M800 adhesive deadener from Radcure, Inc. of Fairfield, N.J. and FT33HG adhesive deadener from Northwest Coatings of Oak Creek, Wis. Similarly, the interlock tab 254 (including the extensions 256 and the pull tab 259) is coated on its underside with the deadened adhesive 211. The deadened adhesive 211 does not adhere to the article 7 so that the label 200 may be used in the same manner as described above with regard to the label 100.

As a further alternative (not shown), the adhesive deadener may be replaced with a permanently adhered or releasable coherent layer such as a web of face stock or a release liner. This layer is preferably only applied over the adhesive present on the hanger 230 and on the tab 254 and serves to prevent exposure of this adhesive.

Figure 8:
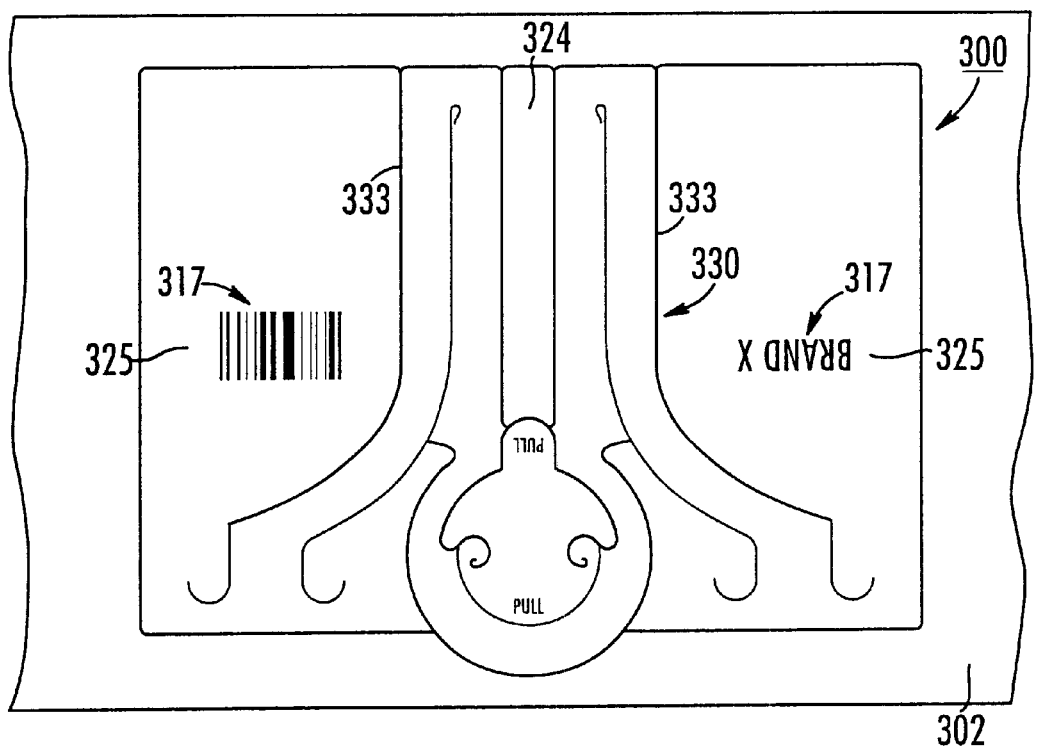
FIG. 8 is a top plan view of a label according to a further embodiment mounted on a release liner.

With reference to FIG. 8, a label 300 according to a further embodiment is shown therein mounted on a release liner 302. The label 300 corresponds to the label 100 except as follows. The anchoring portion is extended to include portions 325 which are separated from the hanger 330 by diecuts 333. Also, a center portion 324 is positioned between the legs of the hanger 330. The center portion 324 and the portions 325 are coated with adhesive corresponding to the adhesive 110. Suitable indicia 317 such as product identification and a bar code are printed on the portions 325.

Figure 9:
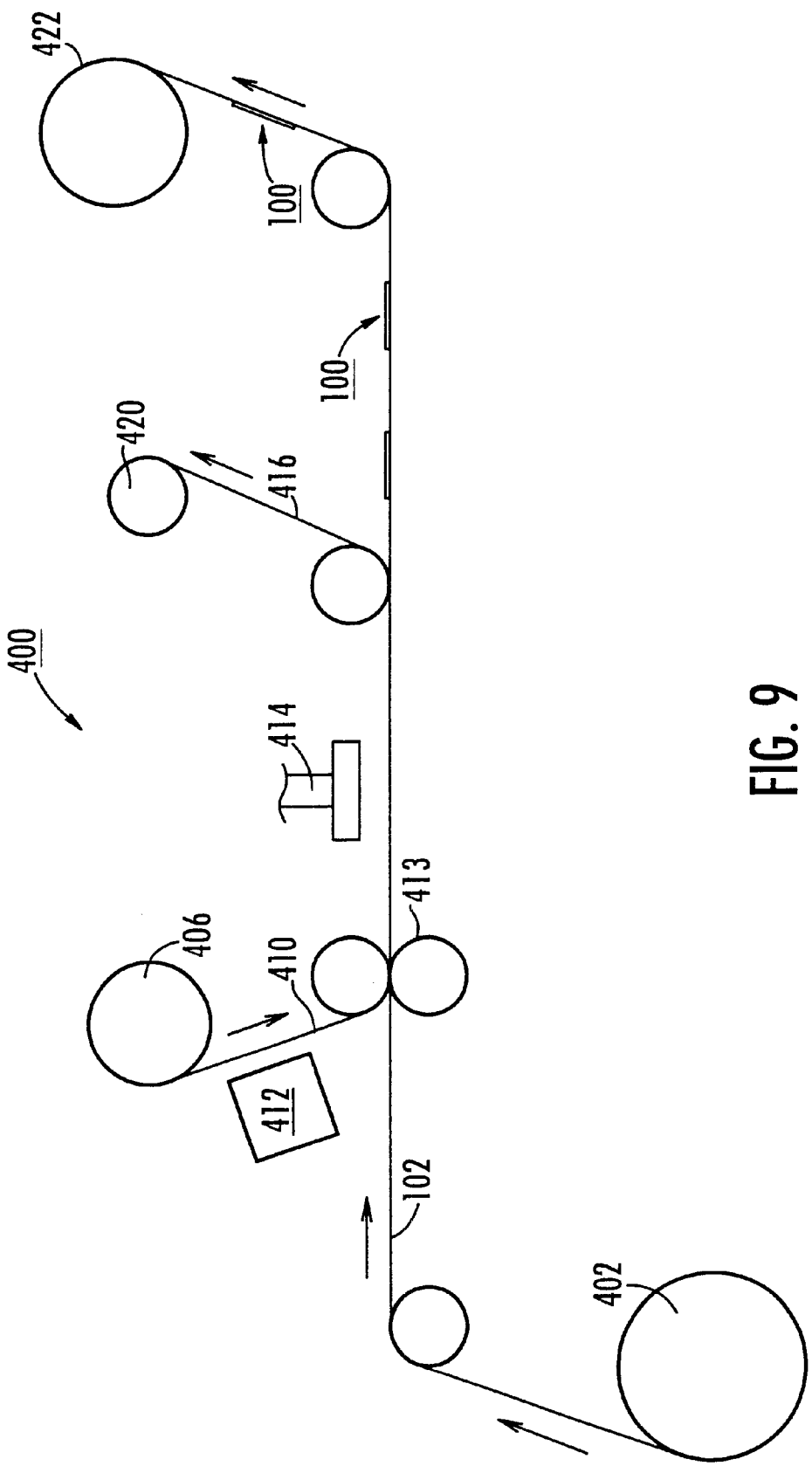
FIG. 9 is a diagram of an apparatus for forming the label of FIG. 1.

With reference to FIG. 9, an apparatus 400 for making the label 100 or the label 300 is shown therein and will be described with reference manufacture of the label 100. The release liner 102 is unwound from an unwinding station 402. A non-adhesive web 410 of material corresponding to the suspension layer 120 is unwound from an unwinding station 406. An adhesive print station 412 prints the adhesive 110 in the appropriate pattern on the underside of the web 410. The adhesive coated surface of the web 410 is married to the release liner 102 by nip rollers 413. A diecut station 414 forms the diecuts of the label 100 as well as the periphery of the label 100. A waste matrix 416 including the portion of the web 410 outside of the label 100 is taken away by a winding station 420. The labels 100 are then wound onto a roll at a winding station 422.

The method and apparatus as described above may be used to make the label 200 with suitable modifications. In particular, the web 410 is replaced with a self-adhesive web (which may be provided as a release liner backed face stock, whereupon the release liner would first be removed) and the adhesive print station 412 is replaced with an adhesive deadener printing station which prints the appropriate pattern of adhesive deadener.

Figure 10:
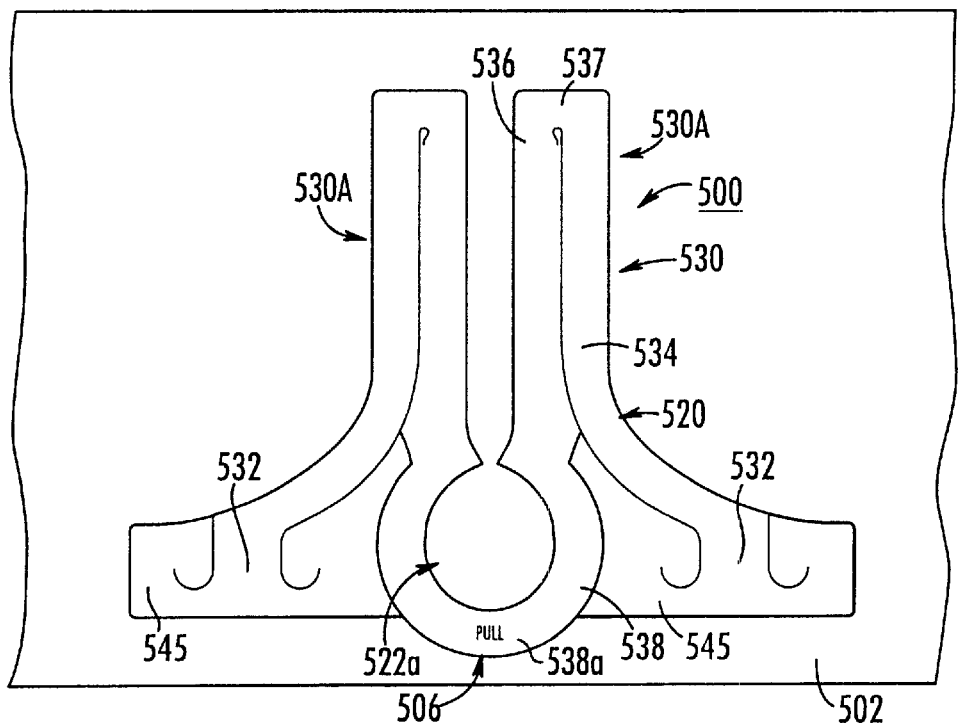
FIG. 10 is a top plan view of a label according to a further embodiment mounted on a release liner.
Figure 11:
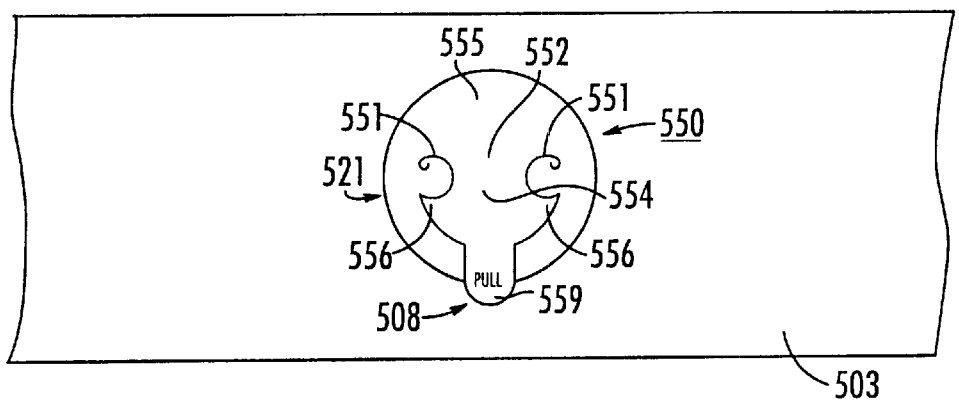
FIG. 11 is a top plan view of an interlock tab member associated with the label of FIG. 10 and mounted on a release liner.
Figure 12:
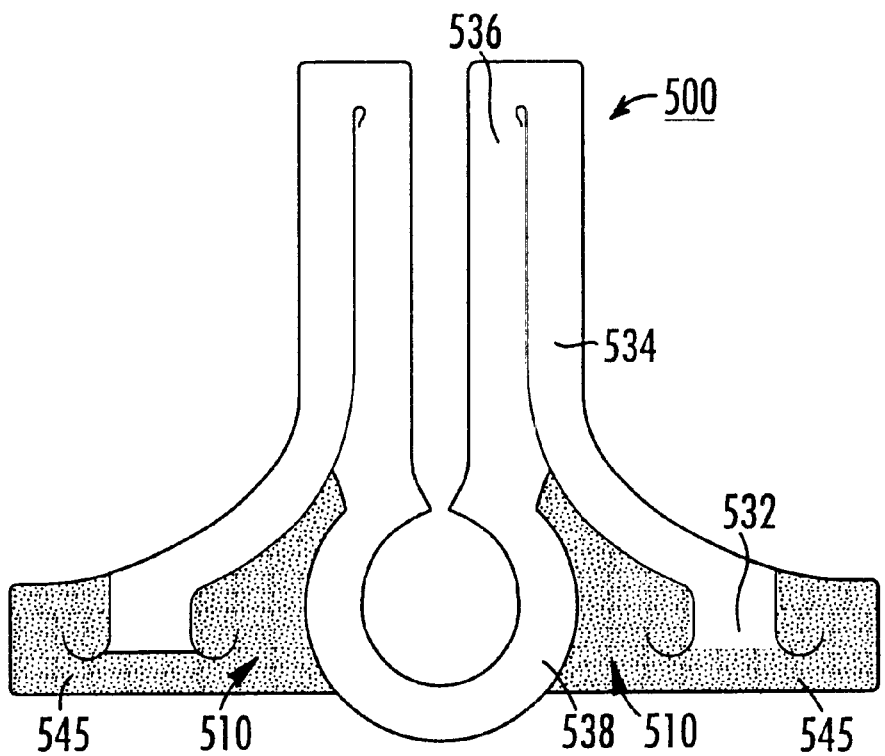
FIG. 12 is a bottom plan view of the label of FIG. 10.
Figure 13:
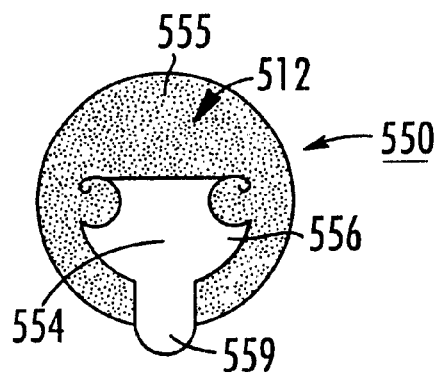
FIG. 13 is a bottom plan view of the interlock tab member of FIG. 11.

With reference to FIGS. 10 and 11, a label 500 according to a further embodiment is shown therein disposed on a release liner 502 and an interlock tab member 550 is shown therein mounted on a release liner 503. The label 500 and the tab member 550 are constructed in the same manner as the label 100 except that the tab member 550 is separately formed from the label 500. The label 500 includes elements 506, 520, 522A, 530, 530A, 532, 534, 536, 537, 538, 538A, and 545 corresponding to elements 106, 120, 122A, 130, 130A, 132, 134, 136, 137, 138, 138A, and 145, respectively. The tab member 550 includes a suspension layer 521 corresponding to the portion of the suspension layer 120 forming the interlock tab portion 150. The tab member 550 also includes elements 508, 551, 552, 554, 555, 556, and 559 corresponding to elements 108, 151, 152, 154, 155, 156, and 159, respectively. Notably, the loop 538 and the extensions 556 are shaped differently from the corresponding components of the label 100. The separate formation of the label 500 and the tab member 550 allows the loop 538 and the extensions 156 to be made smaller. FIGS. 12 and 13 show the pattern of the adhesive 510 and the adhesive 512 on the rear surface of the label 500 and the tab member 550, respectively. The label 500 and the tab member 550 may be formed with deadened adhesive in place of the omitted adhesive, as discussed above with regard to the label 200.

Figure 14:
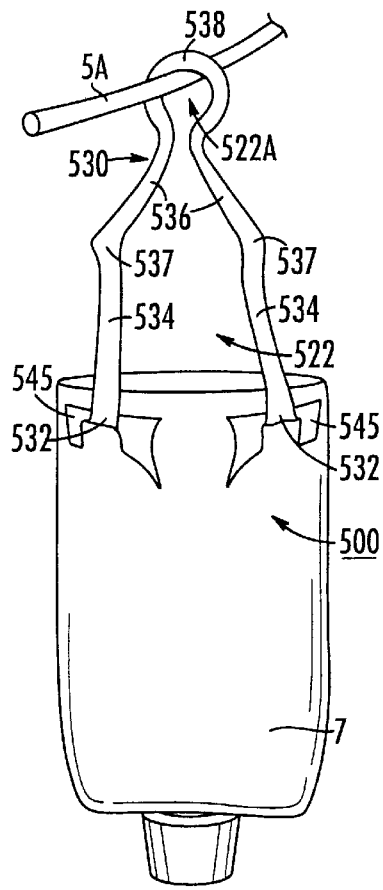
FIG. 14 is a perspective view of the label of FIG. 10 mounted on an article and disposed in a first hanging position.
Figure 15:
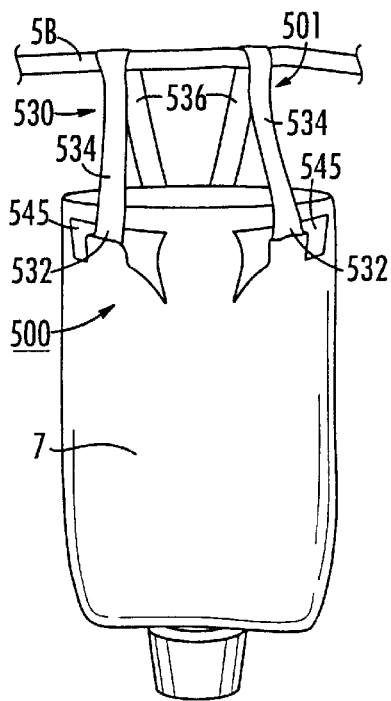
FIG. 15 is a perspective view of the hanger of FIG. 10 mounted on the article and disposed in a second, alternative hanging position.
Figure 16:
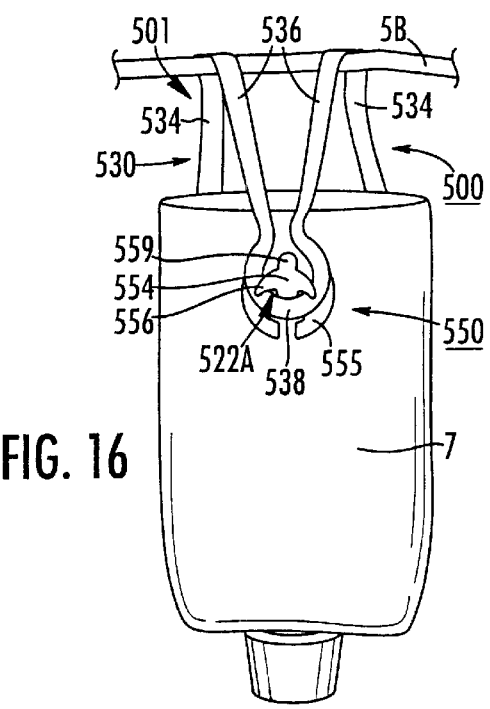
Figure 17:
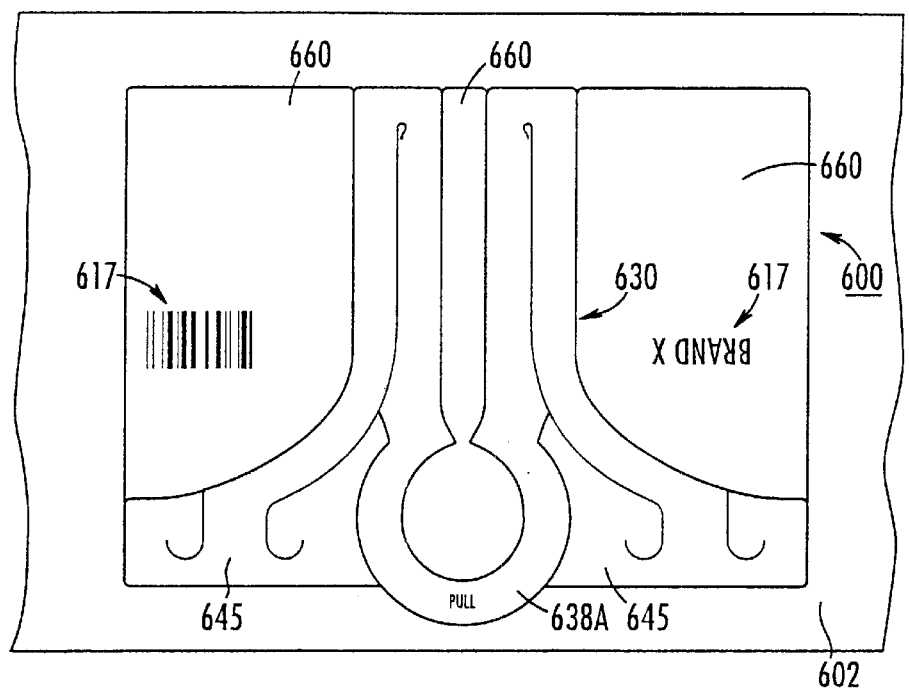
FIG. 17 is a top plan view of a label according to a further embodiment mounted on a releaseliner.
Figure 18:
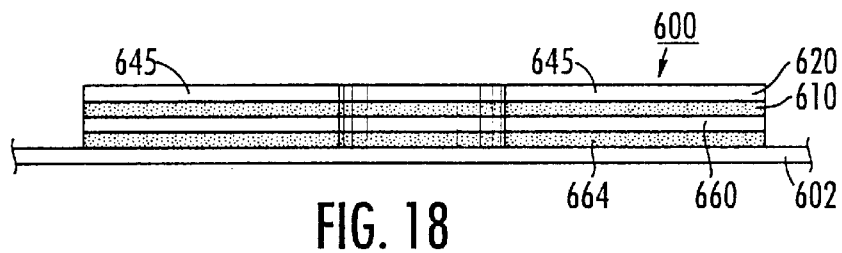
FIG. 18 is a side elevational view of the label of FIG. 17 mounted on the release liner.
Figures 19, 20:
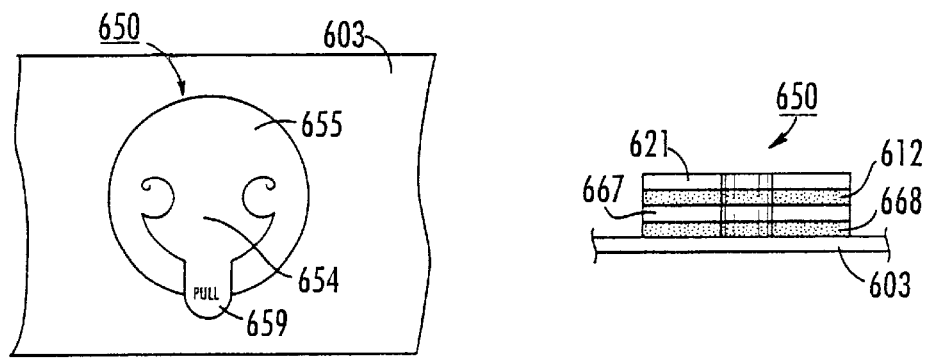
FIG. 19 is a top plan view of an interlock tab member associated with the label of FIG. 17 and mounted on a release liner.
FIG. 20 is a side elevational view of the interlock tab member of FIG. 19 mounted on the release liner.

With reference to FIGS. 14–16, the label 500 and the tab member 550 may be mounted and used in a manner similar to that of label 100. The label 500 and the tab member 550 may each be mounted using suitable equipment. Preferably, the label 500 and the tab member 550 are mounted on opposite sides of the article 7 as illustrated. The label 500 and the tab member 550 may also be mounted on the same side of the article 7. The hanger 530 and the interlock tab 554 remain in the stored position (as shown in FIGS. 10 and 11) until the user wishes to suspend the article 7 from a support 5A or a support 5B. If the user wishes to suspend the article 7 from the support 5A having a free end, the user lifts the hanger 530 and places the loop 538 over the support 5A as shown in FIG. 14. If the user desires to mount the article 7 on the support 5B in the manner shown in FIG. 16, the user lifts and folds the interlock tab 554 about the end 552 (not visible in FIG. 16). The user then lifts the loop 530 over the support 5B and to the opposite side of the article 7. The user places the loop 538 about the interlock tab 554 so that the loop 538 interlocks with the extensions 556 to form a hanging loop 501.

The label 500 allows selective placement of the tab member 550 in a position on the article 7 which increases the stability of the hanging article 7. Also, the label 500 and the tab member 550 allow greater flexibility in arranging the hanging configuration. Multiple tab members 550 may be provided and mounted on the article 7 to allow selection between different hanging lengths.

With reference to FIGS. 17–20, a label 600 is shown therein mounted on a release liner 602 and a tab member 650 is shown mounted on a release liner 603. The label 600 and the tab member 650 have elements 630, 645, 654, and 655 corresponding to the elements 530, 545, 554, and 555, respectively, and are similar to the label 500 and the tab member 550, respectively, except that the label 600 and the tab member 615 include multiple plies. The suspension layer 620 corresponds to the suspension layer 520 and is adhered to a base layer 660 by adhesive 610. The base layer 660 includes indicia 617 which may include product identification and a bar code. The base layer 660 is in turn releasably adhered to the release liner 602 by an adhesive layer 664. Similarly, the suspension layer 621 corresponds to the layer 521 and is adhered to a base layer 667 by an adhesive layer 612. The base layer 667 is in turn releasably adhered to the release liner 603 by an adhesive layer 668. Suitable adhesives for adhesive layers 664 and 668 include B-122 adhesive from Brownbridge Industries of Ohio. The preferred materials of the adhesives 610 and 612 will depend on the material of the base layers 660 and 667. Suitable adhesives may include S-3000 adhesive available from Fasson. Suitable materials for the base layers 660, 667 include 2.3 mil biaxially oriented polypropylene from Brownbridge Industries or polyester film.

The label 600 and the tab member 650 may be formed in two alternative constructions. According to the first construction, the entire layer 620 or 621 is adhered to the upper surface of the corresponding base layers 660, 667 and the adhesive 664, 668 coats the entire underside of the base layer 660, 667 except beneath the hanger 630 or the tab 654. The layers 620, 610, 660 and 664 or the layers 621, 612, 667, and 668 are diecut fully through to the upper surface of the release liner 602, 603. Thus, the hanger 630 which may be lifted away from the article to which the label 600 is applied will include two plies, namely, the ply formed from the layer 620 and a ply formed from the layer 660. Similarly, the interlock tab 654 will include two plies, namely, a ply formed from the layer 621 and a ply formed from the layer 667.

Methods and apparatus for forming a label constructed as just described will be apparent to those of skill in the art upon a reading of the foregoing description as well as the description regarding the manufacture of the label 100. For example, the web 410 (see FIG. 9) may be replaced with a composite web including a web corresponding to the layer 620, a web corresponding to the layer 660, for example, and an adhesive corresponding to the adhesive 610 securing the webs to one another. The adhesive print station applies adhesive to the underside of the web corresponding to the layer 660.

According to a second, alternative construction, the label 600 and the tab member 650 may have diecuts only down to the upper surface of the base layer 660, 667. In this case, the adhesive 664, 668 fully coats the underside of the respective base layer 660, 667. The adhesive layers 610 and 612 have the same pattern as described above with regard to the adhesive layers 510 and 512, respectively. The pull tabs 638A, 659 may have a multi-ply construction with a lower ply formed from the base layer 660, 667 as described with respect to FIG. 13 of applicant's U.S. Pat. No. 5,738,381, the disclosure of which is hereby incorporated herein in its entirety.

The method and apparatus for manufacturing the label according to the second, alternative construction may be similar to the method and apparatus described above with regard to the label 100 except as follows. The release liner 102 is replaced with a composite web including the release liner 102, a web corresponding to the base layer 660 or 667, and a layer of adhesive corresponding to the adhesive 664 or 668 therebetween. The diecut step includes cutting the cut lines which form the hanger 630 and the tab 654 down to the upper surface of the web corresponding to the base layer 660, 667 and cutting down to the release liner 602, 603 about the periphery of the label 600 or the tab member 650.

The two ply constructions as just described may also be used in a label having a configuration like that of the label 100. Suitable modifications to the label 100 will be readily apparent to those of skill in the art upon a reading of the foregoing description. Additionally, an adhesive deadener may be used in the label 600 and the tab member 650 Fin place of the omitted adhesive.

Figure 21:
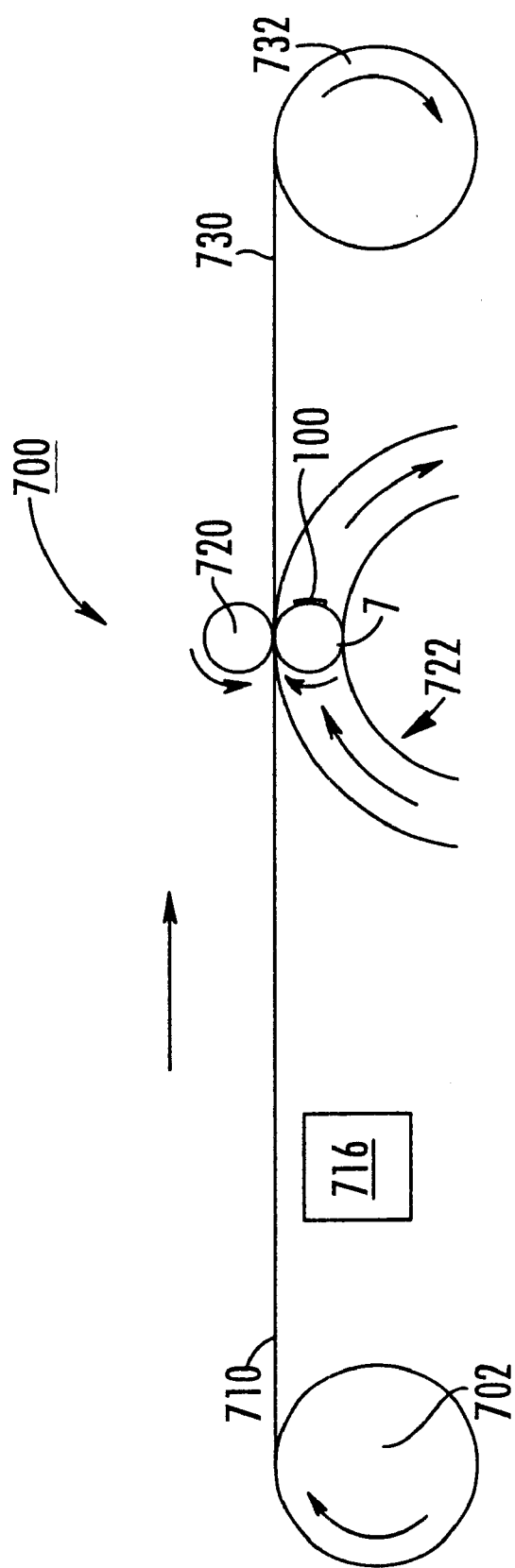
FIG. 21 is a diagram of an apparatus for forming and applying cut labels according to the embodiment of FIG. 1.

With reference to FIG. 21, labels corresponding to each of the labels 100–600 or tab members corresponding to any of the tab members 550, 650 may be provided as "cut labels", i.e., labels which are applied directly to articles without first being mounted on a release liner. The manufacture and application of such a label will be described below with regard to the label 100, however, suitable modifications to the described method and apparatus as appropriate for forming the other labels and interlock tab members as described above will be apparent to those of skill in the art upon reading the description herein.

A web 710 corresponding to the suspension layer 120 is unwound from an unwinding station 702. As the web 710 passes by an adhesive print station 716, the pattern of adhesive corresponding to the adhesive 110 is printed on the underside thereof. The article 7 travels down a lane 722 in the direction indicated. As the article 7 meets the web 710, a die cutter 720 rotating in a counterclockwise direction and using the article 7 as a backing surface, cuts through the web 710 to form the label 100. Notably, the die cut is registered with the printed pattern of adhesive from the adhesive print station 716. The article 7 is rotated in a clockwise direction so that the label 100 is taken onto the article's outer surface and the label 100 is adhered to the article 7 by the adhesive from the adhesive print station 716. A waste web 730 including the portions of the web 710 and the adhesive (if any) outside of the die cut is wound onto a winding stand 732.

Any of the foregoing suspension layers of the labels 100, 200, 300, 400, 500, and 600 and the tab members 550 and 650 may be constructed in a multi-ply construction as described in applicant's U.S. Pat. No. 5,878,901, the disclosure of which is hereby incorporated herein by reference in its entirety. In a two-ply suspension layer, the second ply is preferably a polyester layer secured to the first ply (constructed as described above) by S-3000 adhesive.

Figure 22:
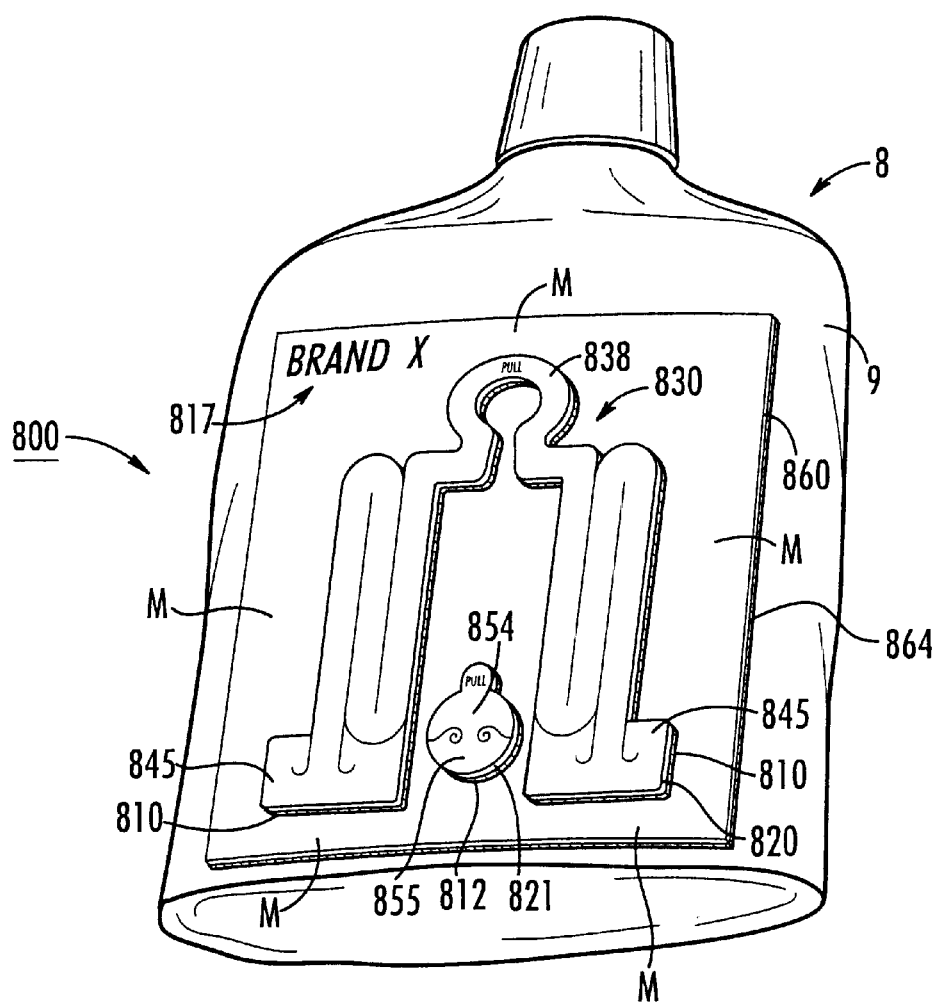
FIG. 22 is a perspective view of a molded suspendable assembly including a label according to a further embodiment.

With reference to FIG. 22, a label 800 according to a further embodiment is shown therein mounted on a molded article (a container in the illustrated embodiment) 9 to form a molded suspendable assembly 8. The label 800 includes a base layer 860. Suitable indicia 817 is printed on the base layer. The base layer 860 is adhered to the outer surface of the article 9 by an adhesive 864. A suspension layer 820 is secured to the upper surface of the base layer 860 by adhesive patches 810. The layer 820 includes a hanger 830, a loop 838 and hanger anchoring portions 845 generally corresponding to the elements 130, 138, and 145, respectively. Only the anchoring portions 845 are secured to the base layer 860 by the adhesive 810. Similarly, a suspension layer 821 is secured to the upper surface of the base layer 860 by an adhesive patch 812. The layer 821 includes an interlock tab 854 and an anchoring portion 855 generally corresponding to the elements 154 and 155, respectively. Only the anchoring portion 855 is secured to the base layer by the adhesive 810. Notably, a margin M of the base layer 860 surrounds the suspension layers 820, 821. Optionally, the anchoring portions 845, 855 may extend to the periphery of the base layer 860. However, it is preferred that the hanger 830 and tab 845 be spaced from the edges of the base layer, as discussed below.

The label 800 is applied to the article 9 during the molding thereof using any suitable in-mold labeling technique. The label 800 may be supplied from a cut stock or roll of such labels. Typically, the label 800 (i.e., elements 810, 812, 820, 821, 860 and 864) will be placed in the mold, either on the mold wall or on the mold stock, prior to the molding step. If necessary, a recess in the mold wall or other accommodation for the label 800 may be made. The molding process may be any suitable molding process such as blow molding or injection molding. Suitable in-mold labeling techniques and materials will be apparent to those of skill in the art upon reading the description herein.

The base layer 860 is formed of a material suitable for in-mold labeling with the article 9, i.e., a material which will adequately bond with the material of the article 9 as the article 9 is being formed in a molding process. Suitable materials may include a preformed material including a material corresponding to the base layer 860 coated with a suitable adhesive corresponding to the adhesive 864. Suitable materials of this type include an in-mold label stock from Fasson such as 4 mil FASCLEAR IN-MOLD™ material (product no. 72854) with a heat activatable adhesive. Alternatively, a web of suitable base layer material, preferably a biaxially oriented polypropylene film, is coated with a suitable adhesive such as that found on the FASCLEAR IN-MOLD™ material. The adhesive layer 864 may be heat and/or pressure activated in the mold. The adhesives 810, 812 and the layers 820, 821 are formed of suitable materials to ensure that the anchoring portions 845, 855 are adequately secured (for suspending the container) to the base layer 860 following the molding process. Preferably, the melting point of the adhesives 810, 812 will be high enough as compared the molding temperature to ensure that the adhesives 811, 812 maintain the anchoring portions 845, 855 in position on the base layer 860 throughout the molding process. The suspension layers 820, 821 should be formed of a material which will not substantially bond with the base layer 860 as a result of the molding process. Preferably, the layers 820, 821 are formed of a material which will not bond at all with the base layer 860 as a result of the molding process. However, in some applications, it may be desirable to allow a small amount of bonding to temporarily hold the hanger 830 and/or the tab 854 down until needed.

It is also contemplated that the base layer 860 may be secured to the article 9 by means other than an adhesive such as the adhesive layer 864. For example, by selection of an appropriate material for the base layer, the base layer may be mechanically bonded to the article 9 by the in-mold labelling process.

Because the label 800 includes separate layers for bonding to the article 9 and for forming the hanger 830 and the tab 854, the materials for these components may be chosen as appropriate for their respective functions. Because the hanger 830 and the tab 854 are not adhered to the base layer 860, they may be deployed in the manner described above. It will be appreciated that various other aspects and modifications as described above with regard to other embodiments of the invention may be applied to the label 800 as well. Moreover, it is contemplated that the tab 854 and the associated adhesive 812 (and, hence, the advantages thereof) may be omitted.

The margin M ensures that the hanger 830 and the tab 854 will not become inadvertently bonded to the article 9 as a result of the molding process. However, in some applications, it may be desirable to allow a portion of the hanger 830 or the tab 854 to extend along or beyond the edge of the base layer 860 to allow some bonding of the hanger 830 or the tab 854 to the article 9 to temporarily hold the hanger 830 and/or the tab 854 down until needed.

While the labels as shown in the drawings and described above include multiple legs, it is also contemplated that the labels may be modified to include a single leg having an eyelet or opening corresponding to the opening 122A, for example. Other hanger configurations may be employed as well. For example, the interlock tab may be longer than the hanger so that the interlock tab (e.g., 154) may be looped around a support and engaged with a loop (e.g., the loop 138) which extends a relatively short distance from the article.

Figure 25:
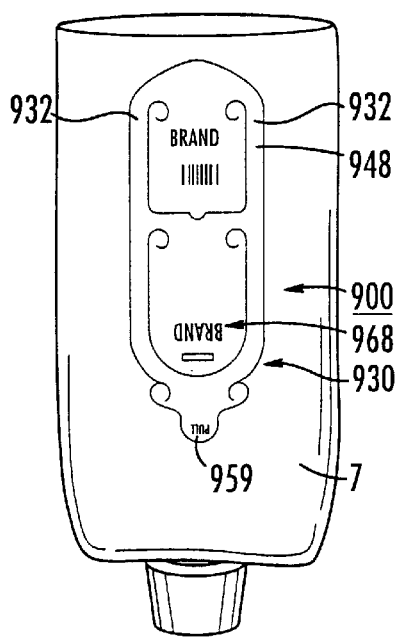
FIG. 25 is a front perspective view of the label of FIG. 23 mounted on the rear surface of an article and in a stored position.
Figure 27:
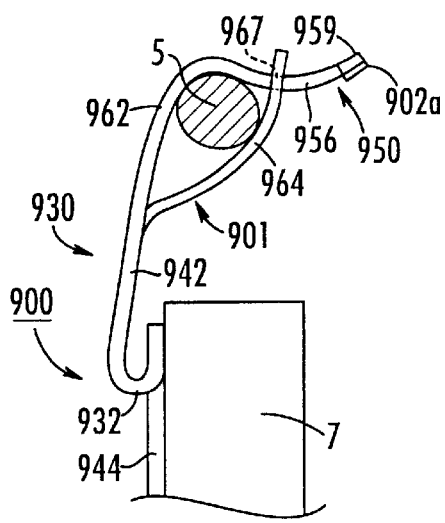
FIG. 27 is a partial, side elevational view of the label of FIG. 23 mounted on the rear surface of the article and in the hanging position.
Figure 26:
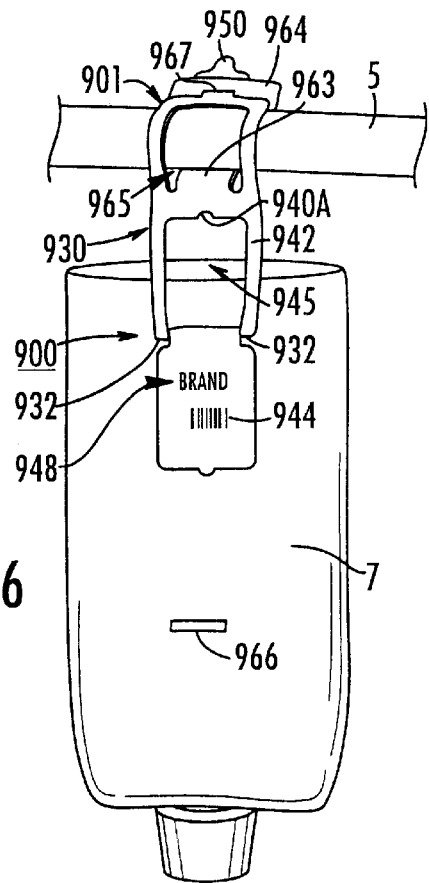
FIG. 26 is a front perspective view of the label of FIG. 23 mounted on the rear surface of the article and in a hanging position.

With reference to FIGS. 23–27, a label 900 according to a farther embodiment is shown therein. The label 900 has a hanger 930 and an interlock tab 950 as described in more detail below. FIG. 23 shows a bottom plan view of the label 900 in a stored position. FIG. 24 is a cross-sectional view of the label 900 mounted on a release liner 902 and ready to be mounted on an article 7 (FIGS. 25–27).

The label 900 includes a layer 920 preferably formed of the materials discussed above for the layer 120. A layer of adhesive 910 coats the underside of the layer 920 and is preferably as described above for the adhesive 120. The adhesive layer 910 includes portions 910A, 910B and 910C. The adhesive layer portion 910A coats an anchoring portion 944 of the layer 920. The adhesive layer portion 910B coats the underside of a tab 966 formed through the layer 920 by a cut line 966A. The adhesive portion 910C coats the underside of a pull tab 959. The adhesive portion 910C is deadened by a layer of deadener 912 as discussed with regard to the label 200. A release liner tab 902A is formed by a cut line 902B through the release liner 902. When the label 900 is removed from the release liner 902, the tab 902A is removably attached to the tab 959 by the deadened adhesive 910C and remains with the tab 959. The pull tab 959 may also be modified as described below with regard to the label 1000.

Cut lines 940, 960 and 956A are also formed through the layer 920. The cut line 940 includes a notch portion 940A and defines opposed primary legs 942 having ends 932. The ends 932 serve as the ends of the hanger 930. The cut line 960 defines opposed secondary legs 962 and a center portion or interlock flap 964 of the layer 920. The cut lines 956A form extensions 956 of the interlock tab 950.

In FIG. 25, the label 900 is shown in a stored position mounted by means of the adhesive 910 on a rear surface of an article 7 such as a bottle. The label 900 may have suitable indicia 948 and 968 on the portions 944 and 964, including a bar code. When the user wishes to suspend the article 7, he or she may grasp the pull tab 959 and lift the hanger 930 away and about the ends 932. The release liner portion 902A facilitates grasping of the pull tab 959. At this time, the user has three alternative hanging options, as follows.

As best seen in FIG. 26, when the hanger 930 is lifted, the anchoring portion 944 remains secured to the surface of the article 7, thereby forming an opening 945 between the legs 942. A rod or other support (not shown) may be inserted through the opening 945 to suspend the article 7. The notch 940A may be used to locate the support. This option may be used to hang the article from a display hanger, a shower head or the like.

Alternatively, the interlock flap 964 may be displaced and folded about the end 963 to form an opening 965 (see FIG. 26). This opening 965 may be used in the same manner as the opening 945 to suspend the article form a support, but allows the article to hang lower.

According to a third option, which is particularly useful in the case of a rod 5 not having a free end, the article may be suspended by configuring the hanger 930 to form a hanging loop 901 as shown in FIGS. 26 and 27. Notably, when the hanger 930 is lifted from the article 7, the adhesive causes the tab 966 to remain with the article, thereby forming an opening 967 in the interlock flap 964 which serves as an interlock receiving portion. The interlock flap 964 is displaced from the legs 962 and wrapped around the rod 5 in the other direction. The interlock tab 950 is inserted through the opening 967 and secured in place by the extensions 956. Preferably, the interlock flap 964 is positioned forwardly of the rod 5 so that the indicia 968 is viewable from the front side of the article 7.

The label 900 may also be formed as a two ply label (not shown) having a base layer corresponding generally to the base layer 660 and underlying and adhered to the layer 920. The hanger layer 920 may be either substantially entirely adhered to the base layer or only partially adhered to the base layer as described above with regard to the label 600. The label 900 may be modified to include a full coating of adhesive and a pattern of adhesive deadener as described with regard to the label 200. Suitable modifications to the label 900 will be apparent to those of skill in the art upon reading the description herein. Indicia (including pull tab indicia such as "PULL") may be printed on the hanger layer itself and/or on the base label if provided. Suitable indicia may be printed on the rear surface of the label 900 as well.

The label 900 may be formed and mounted on the article in the same manners and using the same apparatus as described above with regard to the label 100 with suitable modification of the diecut pattern. Additionally, the adhesive deadener 912 will be applied to the adhesive underlying the pull tab 959.

With reference to FIGS. 28–31, a label 1000 according to a further embodiment is shown therein. The label 1000 is shown mounted on a release liner 1002 in FIG. 29. The label 1000 includes a hanger 1030 and corresponds to the label 900 except as follows. The cut line 1060 is reoriented 180 degrees as compared to the cut line 960 so that a center portion or interlock flap 1064 is formed having a foldable end 1063 adjacent the interlock tab 1050. Additionally, the cut line 1066A is relocated and forms a tab 1066 having an adhesive layer portion 1010B. Additionally, no release liner tab corresponding to the tab 902A is provided. The label 1000 may be manufactured in the same manner and using the same materials as described with regard to the label 900 with suitable modifications as will be apparent to those of ordinary skill in the art from the description herein.

Figure 30:
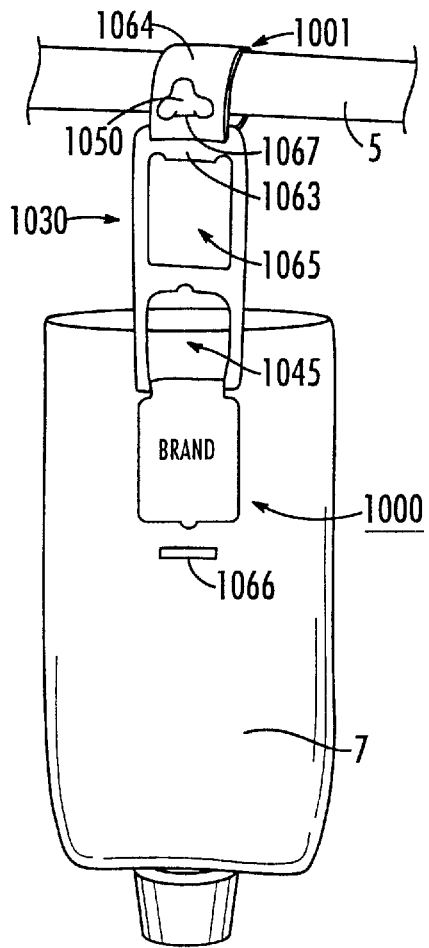
FIG. 30 is a front perspective view of the label of FIG. 28 mounted on the rear surface of an article and in a hanging position.
Figure 31:
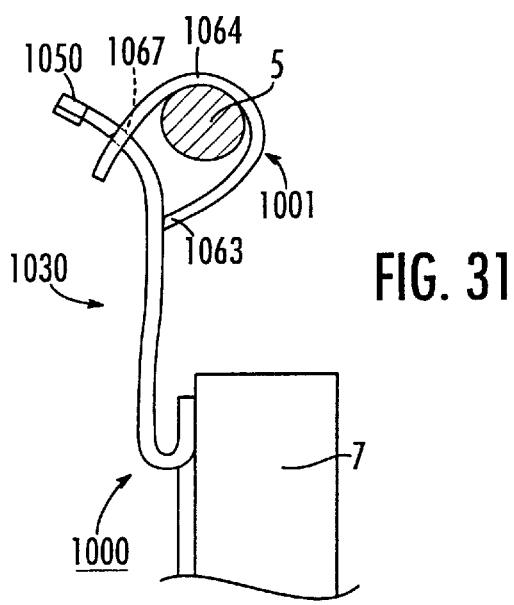
FIG. 31 is a partial, side elevational view of the label of FIG. 28 mounted on the rear surface of the article and in the hanging position.

With reference to FIGS. 30 and 31, the label 1000 may be secured to an article 7 in the same manner as the label 900. If the user desires to suspend the article 7 support having a free end such as a shower head or a display hanger support, the user may insert the support through the opening 1045 or the opening 1065 (formed by displacing the interlock flap 1064 about its end 1063).

The user may also form a closed hanging loop 1001, for example about a towel rack bar, by arranging the hanger 1030 as shown in FIGS. 30 and 31. The interlock flap 1064 is folded out of the hanger 1030 and about its end 1063. The flap 1064 is folded up, over and around the bar 5. The interlock tab 1050 is inserted through the opening 1067 formed by the absence of the tab 1066, which remains secured to the article 7 by the adhesive 1010B.

Notably, when the label 1000 is removed from the release liner 1002, the adhesive 1010C and the deadener 1012 remain with the pull tab 1059. Preferably, the adhesive 1010 is only partly deadened so that it releasably holds the pull tab 1059 to the article 7. When the pull tab 1059 is lifted, the deadener 1012 prevents the adhesive 1010C from being so tacky as to interfere with use of the hanger 1030. It will be appreciated that the label 1000 may be alternatively formed having a pull tab corresponding to the pull tab 959.

With reference to FIGS. 32–36, a label 1100 according to a further embodiment is shown therein. In FIG. 33, the label 1100 is shown mounted on a release liner 1102. The label 1100 corresponds to the label 1000 except as follows. The label 1100 includes a base layer 1118, a base adhesive 1119, and a modified pull tab 1150. No cut line corresponding to the cut line 1060 is provided. Instead, the upper portion of the hanger 1130 has a relatively large body portion 1164. A cut line 1166A formed in the body portion 1164 defines a tab 1166 having an adhesive coating 1110B on its rear surface.

The label 1100 may be manufactured in the same manner and using the same materials as described with regard to the label 900 with suitable modifications as will be apparent to those of ordinary skill in the art upon reading the description herein.

Figure 34:
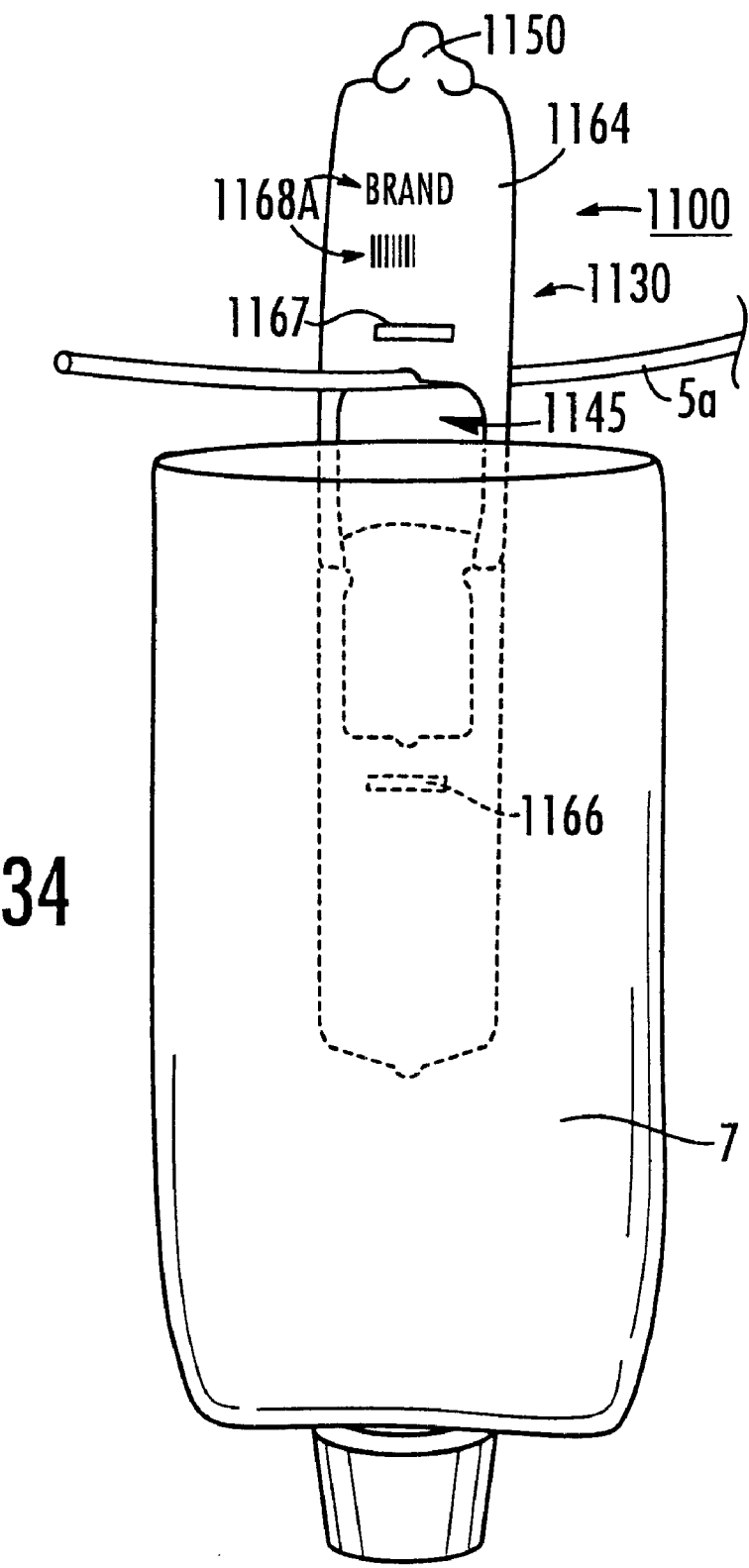
FIG. 34 is a rear perspective view of the label of FIG. 32 mounted on the rear surface of an article and in a first hanging position.

With reference to FIGS. 33 and 34, the label 1100 may be secured to an article 7 by the base adhesive 1119. The hanger 1130 may be deployed by pulling the hanger 1130 away from the base layer 1118, thereby forming an opening 1145 and an opening 1167 (which is formed by the absence of the tab 1166 which remains on the base layer 1118). A support 5A having a free end may be inserted through the opening 1145 to suspend the article 7. Preferably, the body portion 1164 is formed of a sufficiently rigid material to remain upright, thereby providing a prominent display of the indicia 1168A (see FIG. 34) and 1168B (see FIG. 35) which may include a bar code or the like.

Figure 35:
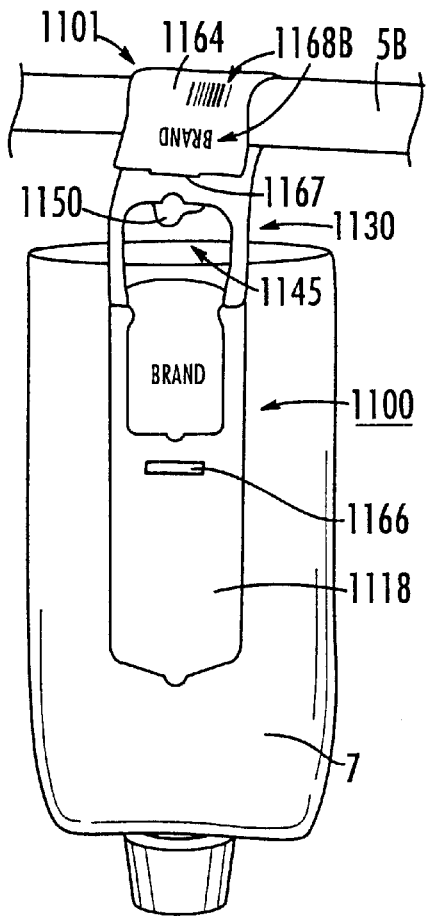
FIG. 35 is a front perspective view of the label of FIG. 32 mounted on the rear surface of the article and in a second hanging position.
Figure 36:
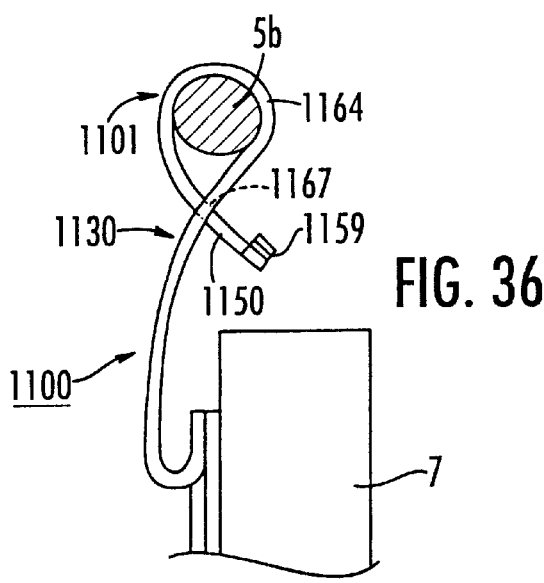
FIG. 36 is a partial, side elevational view of the label of FIG. 32 mounted on the rear surface of the article and in the second hanging position.

With reference to FIGS. 35 and 36, the label may alternatively be configured to form a closed hanging loop 1101 for hanging the article 7. The body portion 1164 is wrapped up, over and down about the bar 5B, and the interlock tab 1150 is then inserted into the opening 1167.

The pull tab 1159 includes an adhesive portion 1110C, a base tab 1118A formed by cut lines 1118B, a base adhesive portion 1119A, a layer of deadener 1112, and a release liner tab 1102A formed by cut lines 1102B. The pull tab 1159 may be formed by undercutting up through the release liner 1102 and the base layer 1118 up to the hanger layer 1120. When the label 1100 is removed from the release liner 1102, the entirety of the pull tab 1159 will remain with the label, including the tab 1102A. The multiple layers of the pull tab 1159 facilitate grasping thereof by the user. Alternatively, the cut lines 1102B may be omitted so that the release liner tab 1102A does not form a part of the pull tab 1159.

It will be appreciated that the label 1100 may alternatively employ pull tabs as described with regard to the labels 900 and 1000. The label 1100 may be formed as a single ply label in the same manner as the labels 900 and 1000. It will be further appreciated that each of the labels 900 and 1000 may be modified to be multiple ply labels similar to the label 1100 and to include a pull tab like the pull tab 1159.

Figure 37:
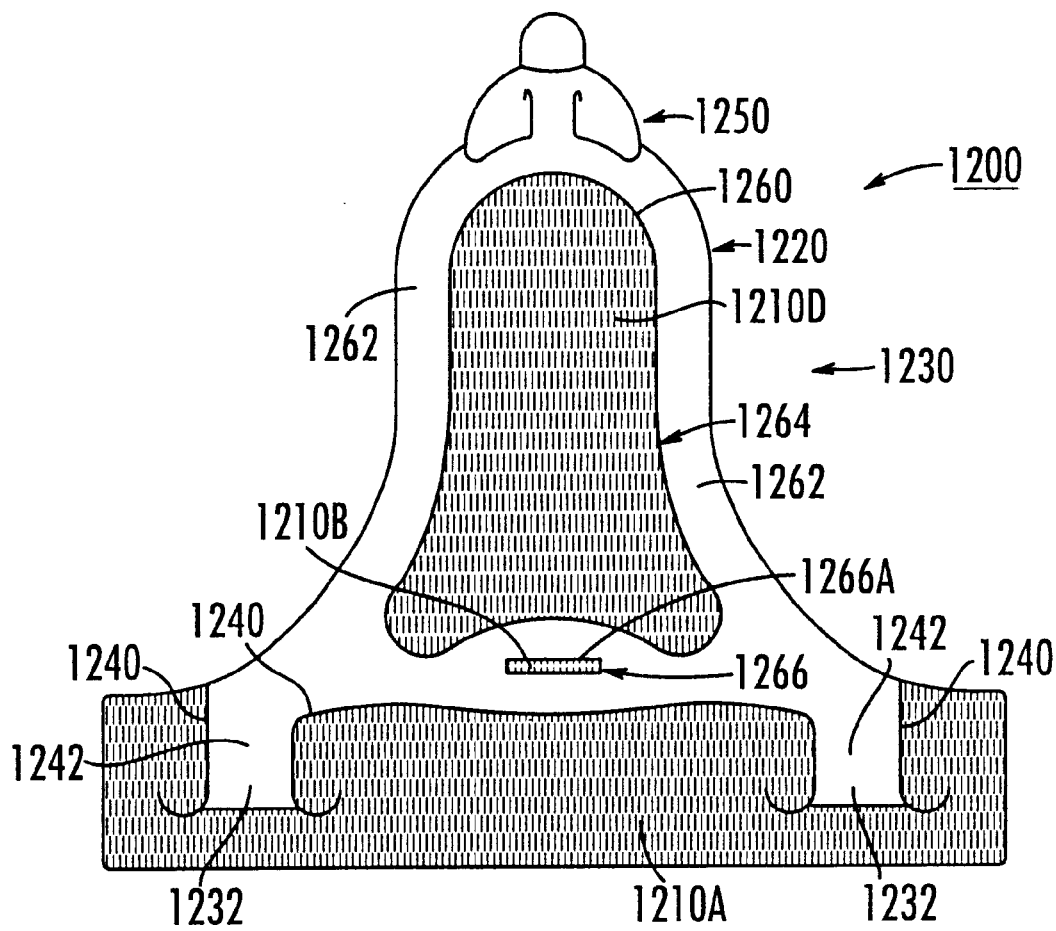
FIG. 37 is a bottom plan view of a label according to a further embodiment of the present invention.

With reference to FIG. 37, a label 1200 according to a further embodiment is shown therein. The label 1200 has primary legs 1242 and is similar to the label 1100 except that a cut line 1260 is formed in the upper portion of the hanger 1230 to form secondary legs 1262 and a center portion 1264 of the layer 1220 which corresponds generally to the layer 920. A connecting portion 1243 is defined by the cut lines 1240 and 1260. An adhesive layer 1210D of permanent adhesive coats the rear surface of the portion 1264. A cut line 1266A in the connecting portion 1243 defines a tab 1266 having an adhesive coating 1210B.

The label 1200 may be secured to an article by means of the adhesive portions 10 1210A, 1210B, 1210D. When the label 1200 is mounted on an article and the hanger 1230 is lifted and folded about the ends 1232, the portion 1264 and the tab 1266 will remain secured to the surface of the article, thereby forming openings in the hanger 1230 where the portion 1264 and the tab 1266 used to be. In view of the foregoing description, it will be appreciated that the user may then insert a support through the upper opening defined within the cut line 1260 or through a lower opening defined within the cut lines 1240. Alternatively, the user may insert the interlock tab 1250 through an opening formed within the cut line 1266A in the same manner as described with regard to the label 1100 to interlock and form a closed hanging loop.

Figure 38:
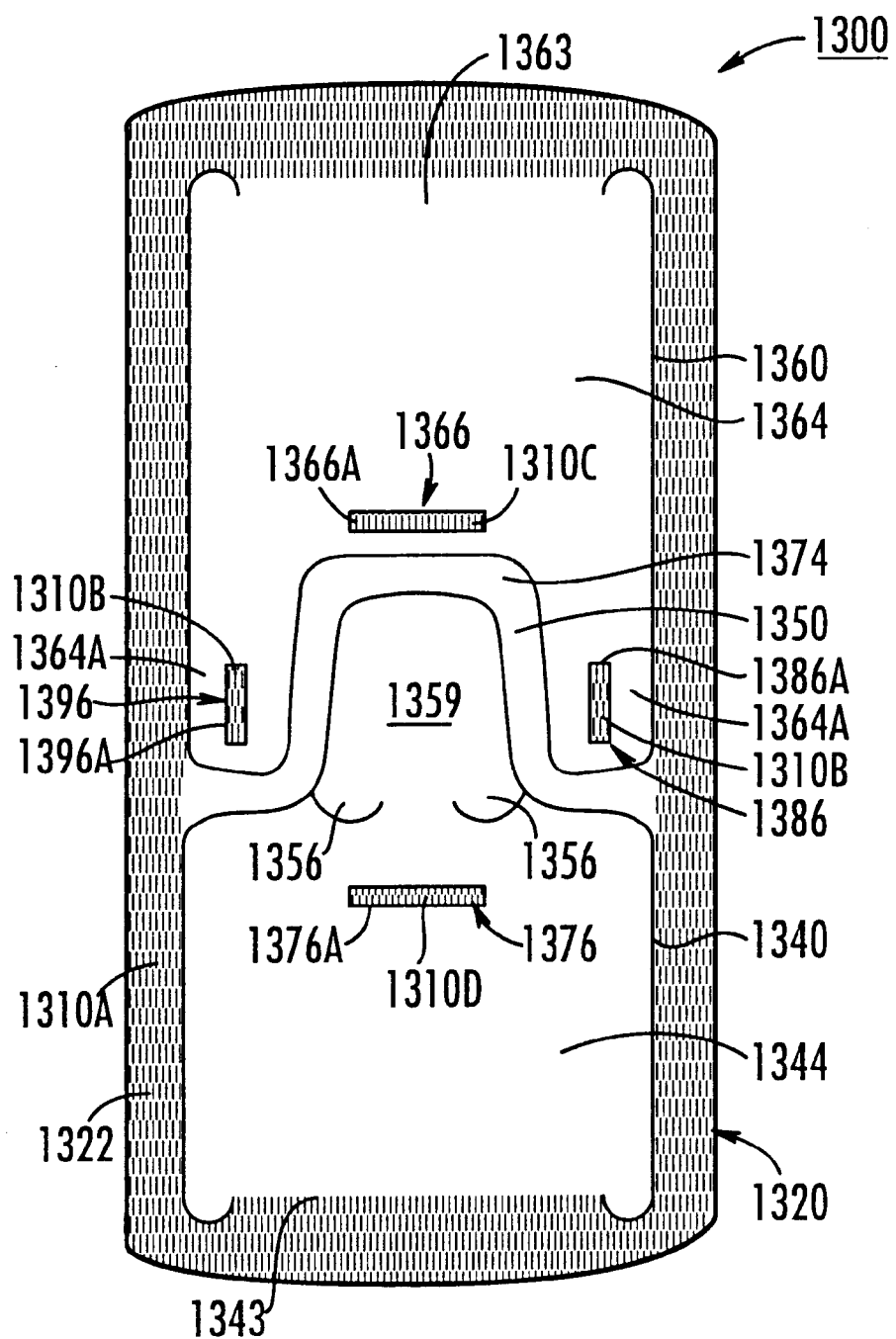
FIG. 38 is a bottom plan view of a label according to a further embodiment of the present invention.

With reference to FIGS. 38–42, a label 1300 according to a further embodiment is shown therein. FIG. 38 shows the rear surface of the label 1300. The label 1300 includes a layer 1320 corresponding to the layer 920. An adhesive layer 1310A coats the rear surface of a surrounding portion 1322 of the layer 1320.

A cut line 1340 defines a portion or flap 1344 which is foldable about an end 1343. The cut line 1340 further defines an interlock tab 1350 including a pull tab 1359 and opposed extensions 1356. A cut line 1376A defines a tab 1376 having an adhesive coating 1310D on its rear surface.

A cut line 1360 defines a portion or flap 1364 which is foldable about an end 1363. The cut line 1360 further defines a pair of opposed supplemental flaps 1364A. A cut line 1366A defines a tab 1366 having an adhesive coating 1310C on its rear surface. Cut lines 1386A and 1396A define tabs 1386 and 1396 on either flap 1364A. Each of the tabs 1386 and 1396 is coated with adhesive 1310B on its rear surface.

The cut lines 1340, 1360 also define a hanging strip 1374 therebetween. Each end of the hanging strip 1374 is joined to the surrounding portion 1322.

Preferably, each of the adhesive portions 1310A, 1310B, 1310C is formed of an adhesive such as described for the adhesive 110. Preferably, the layer 1320 is formed of a stretchable, tear resistant material such as VALERON™ film available from Van Leer Films. Suitable indicia 1348, 1368 (see FIG. 39) may be printed on the layer 1320.

The label 1300 may be secured to an article 7 by means of the adhesive portions 1310A, 1310B, 1310C. The user may then suspend the article 7 from a desired support 5A or 5B using one of four alternative methods.

Figure 39:
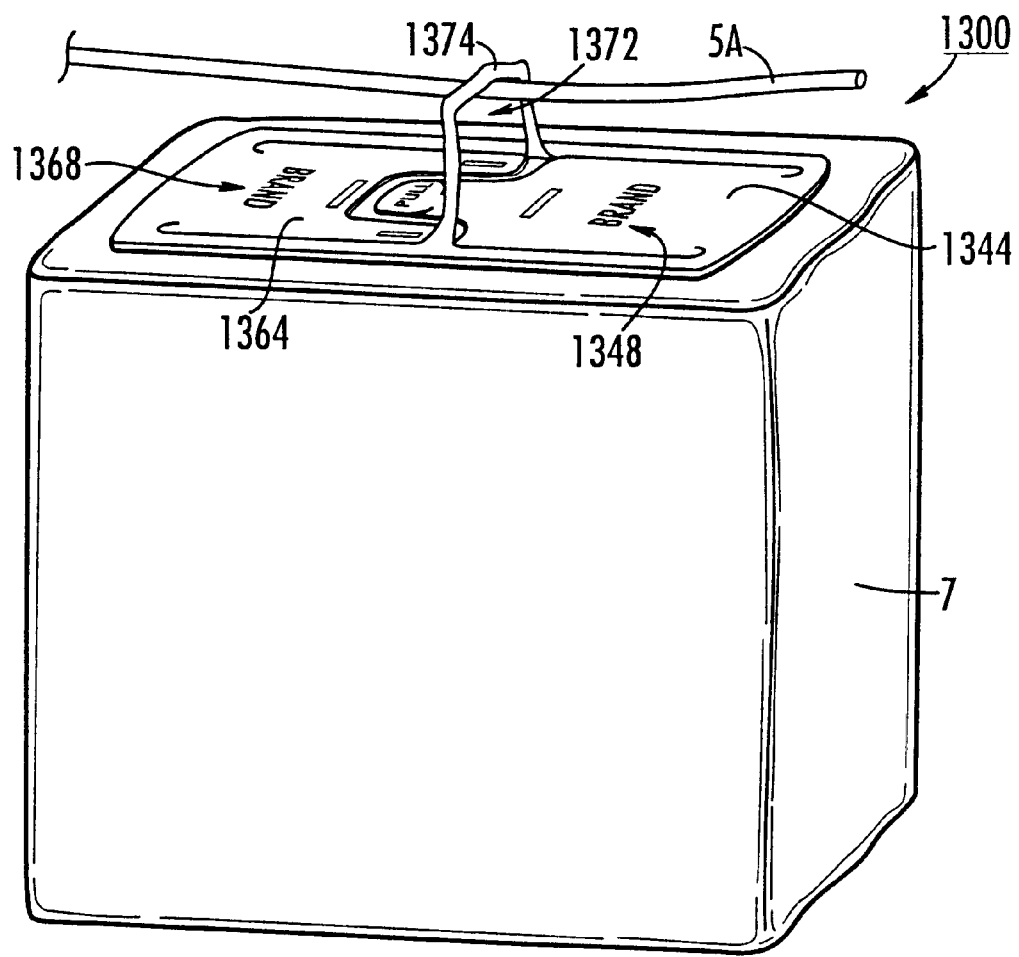
FIG. 39 is a perspective view of the label of FIG. 38 mounted on an article and in a first hanging position.

With reference to FIG. 39, according to a first method, the user may lift the hanging strip 1374 from between the flaps 1344 and 1364. A support 5A may then be inserted through an opening 1372 defined by the hanging strip 1374.

Figure 40:
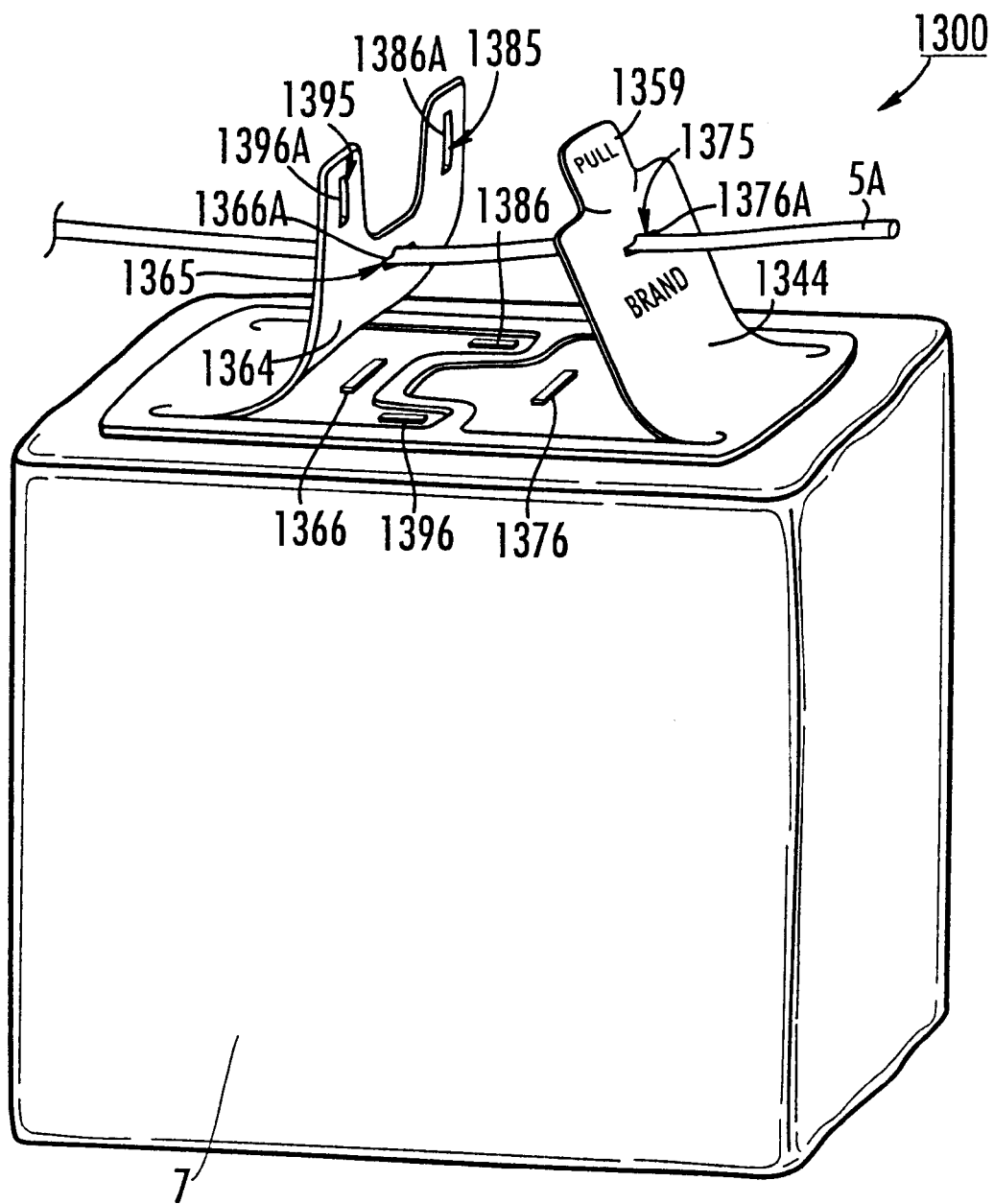
FIG. 40 is a perspective view of the label of FIG. 38 mounted on the article and in a second hanging position.

With reference to FIG. 40, according to a second method, the user may lift each of the flaps 1344 and 1364. The tabs 1366 and 1376 remain secured to the article 7 by the adhesive 1310C and 1310D, thereby forming openings 1365 and 1375 defined by the cut lines 1366A and 1376A. The support 5A may then be inserted through each of the openings 1365 and 1375.

Figure 41:
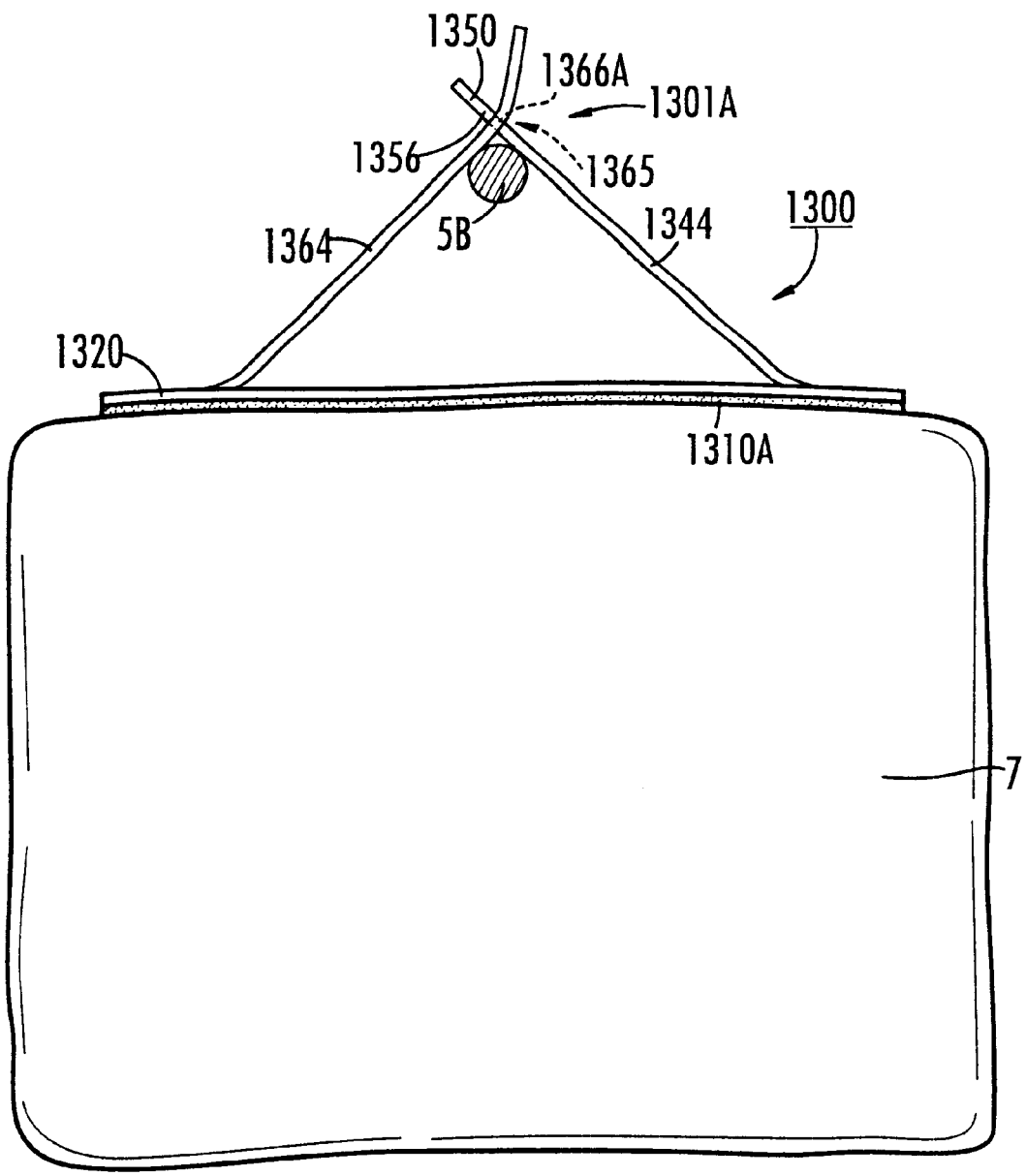
FIG. 41 is a side elevational view of the label of FIG. 38 mounted on the article and in a third hanging position.

With reference to FIG. 41, according to a third method, the user may lift each of the flaps 1344 and 1364. The user may then stretch one or both of the flaps 1344, 1364 and insert the interlock tab 1350 through the opening 1365 to form a hanging loop 1301A. The extensions 1356 interlock with the opening 1365. It will be appreciated that this method may be used to suspend the article 7 from a rod 5B of the type not having an accessible free end.

Figure 42:
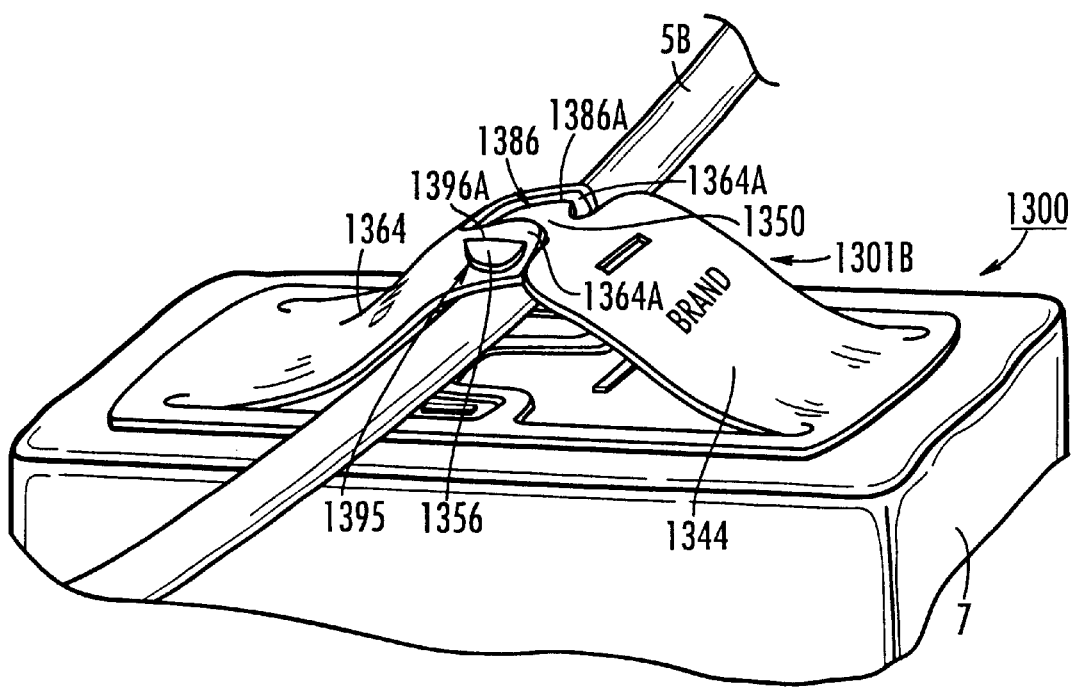
FIG. 42 is a perspective view of the label of FIG. 38 mounted on the article and in a fourth hanging position.

With reference to FIG. 42, according to a fourth method, the user may lift each of the flaps 1344 and 1364. Notably, each of the tabs 1386, 1396 will remain secured to the surface of the article 7 by the adhesive 1310B (see FIG. 40), thereby forming openings 1385 and 1395 defined by the cut lines 1386A and 1396A. The user may then insert the extensions 1356 through respective ones of the openings 1385 and 1395 to interlock the interlock tab 1350 with the flaps 1364A to form a hanging loop 1301B. Depending on the configuration of the cut lines, it may be necessary to stretch one or both of the flaps 1344 and 1364.

It will be appreciated that the label 1300 may be modified as discussed above with regard to the foregoing labels. For example, the label 1300 may be constructed as a two ply label.

Figure 43:
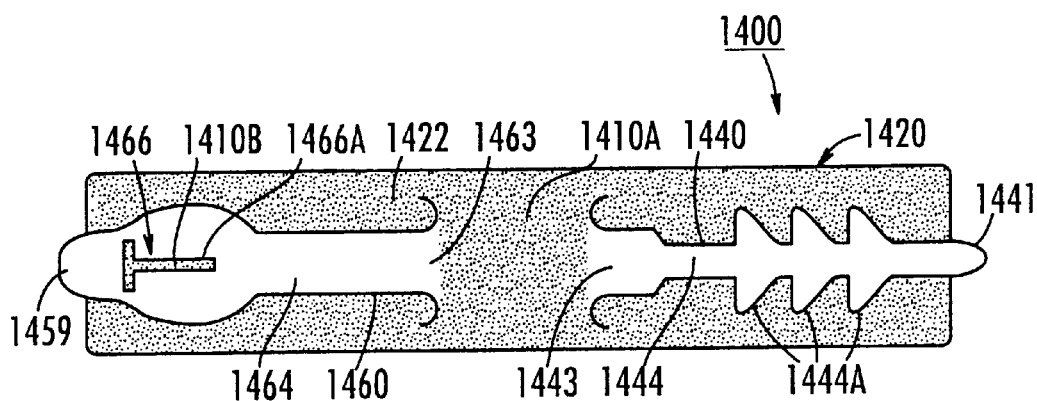
FIG. 43 is a bottom plan view of a label according to a further embodiment of the present invention.

With reference to FIGS. 43–46, a label 1400 according to a further embodiment is shown therein. FIG. 43 shows the rear surface of the label 1400. The label 1400 includes a layer 1420 corresponding to the layer 920. An adhesive layer 1410A coats the rear surface of a surrounding and intermediate portion 1422 of the layer 1420. Suitable indicia 1448 (see FIG. 44) may be printed on the layer 1420.

A cut line 1440 in the layer 1420 defines a portion or flap 1444 which is foldable about an end 1443. The flap 1444 has a pull tab 1441. The flap 1444 further includes a series of opposed extensions or barbs 1444A. More or fewer pairs of barbs 1444A may be provided.

A cut line 1460 defines a portion or flap 1464 which is foldable about an end 1463. The flap 1464 has a pull tab 1459. A cut line 1466A defines a tab 1466 having an adhesive coating 1410B on its rear surface.

The label 1400 may be formed of the same materials and in the same manner as any of the foregoing labels. For example, the label 1400 may be modified to be a two ply label or to include any of the above-described pull tab constructions.

Figure 44:
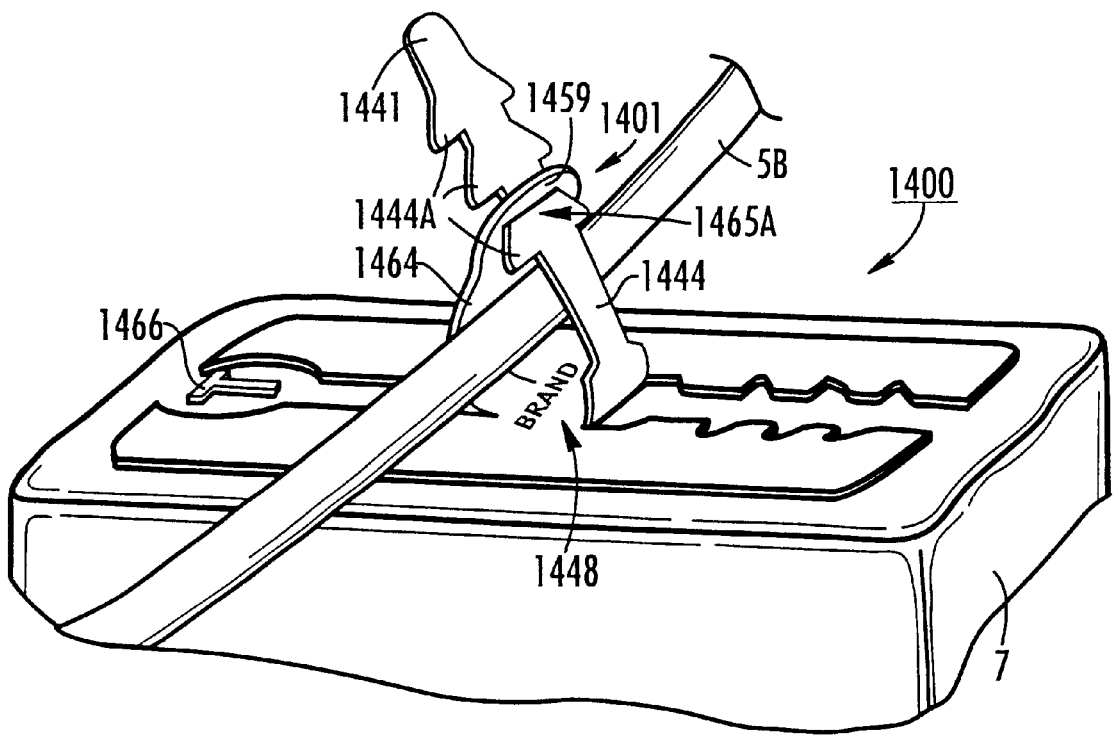
FIG. 44 is a perspective view of the label of FIG. 43 mounted on an article and in a hanging position.

With reference to FIG. 44, the label 1400 may be secured to an article 7, for example, by means of the adhesive portions 1410A, 1410B. To suspend the article 7 from a support 5B such as a towel rod, the user may lift each of the flaps 1444, 1464 using the pull tabs 1441, 1459 and interlock the flaps 1444, 1464 to form a hanging loop 1401. More particularly, when the flap 1464 is lifted, the T-shaped tab 1466 remains secured to the surface of the article 7 (see FIG. 44), thereby forming a horizontal opening 1465A and a longer, intersecting, vertical opening 1465B (see FIG. 45) in the flap 1464. Preferably, the opening 1465B is long enough to substantially accommodate the barbs 1444A while the opening 1465A is narrower than the barbs 1444A. The user rotates the flap 1444 90 degrees to align the barbs 1444A with the opening 1465B and pulls the one or more of the pairs of barbs 1444A through the opening 1465B, depending on the desired size of the hanging loop 1401. The user then rotates the flap 1444 back to its original position and repositions the flap 1444 into the opening 1465A so that the last barb pulled through the opening 1465B resists withdrawal of the flap 1444.

Figure 46:
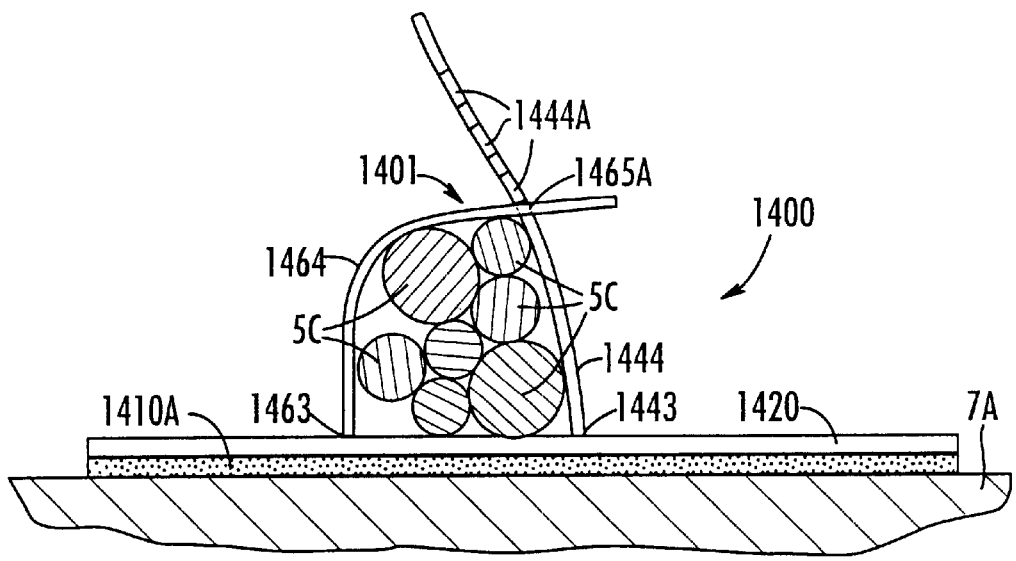
FIG. 46 is side elevational view of the label of FIG. 43 mounted on a base support and securing a plurality of cables.
Figure 45:
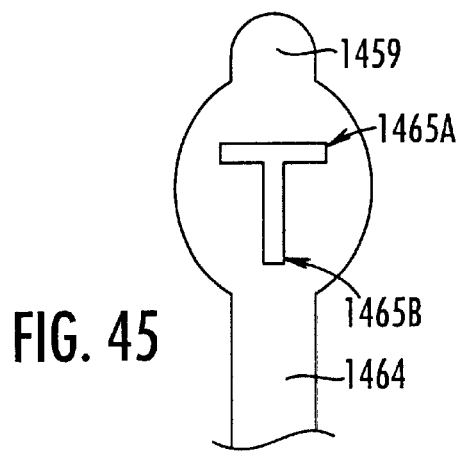
FIG. 45 is an enlarged, partial elevational view of a portion of the label of FIG. 43 lifted away from the remainder of the label.

With reference to FIG. 46, an alternative use of the label 1400 is illustrated therein. The label 1400 is secured to a base support 7A such as an electronic device, a wall or a vehicle by the adhesive 1410A, 1410B (see FIG. 43). A plurality of longitudinally extending objects 5C such as electrical cables are bound in the hanging loop 1401 formed by the interlocked flaps 1444, 1464. Notably, the size of the hanging loop 1401 may be selected by the user to accommodate and securely fasten about different size bundles of cables 5C.

Figure 47:
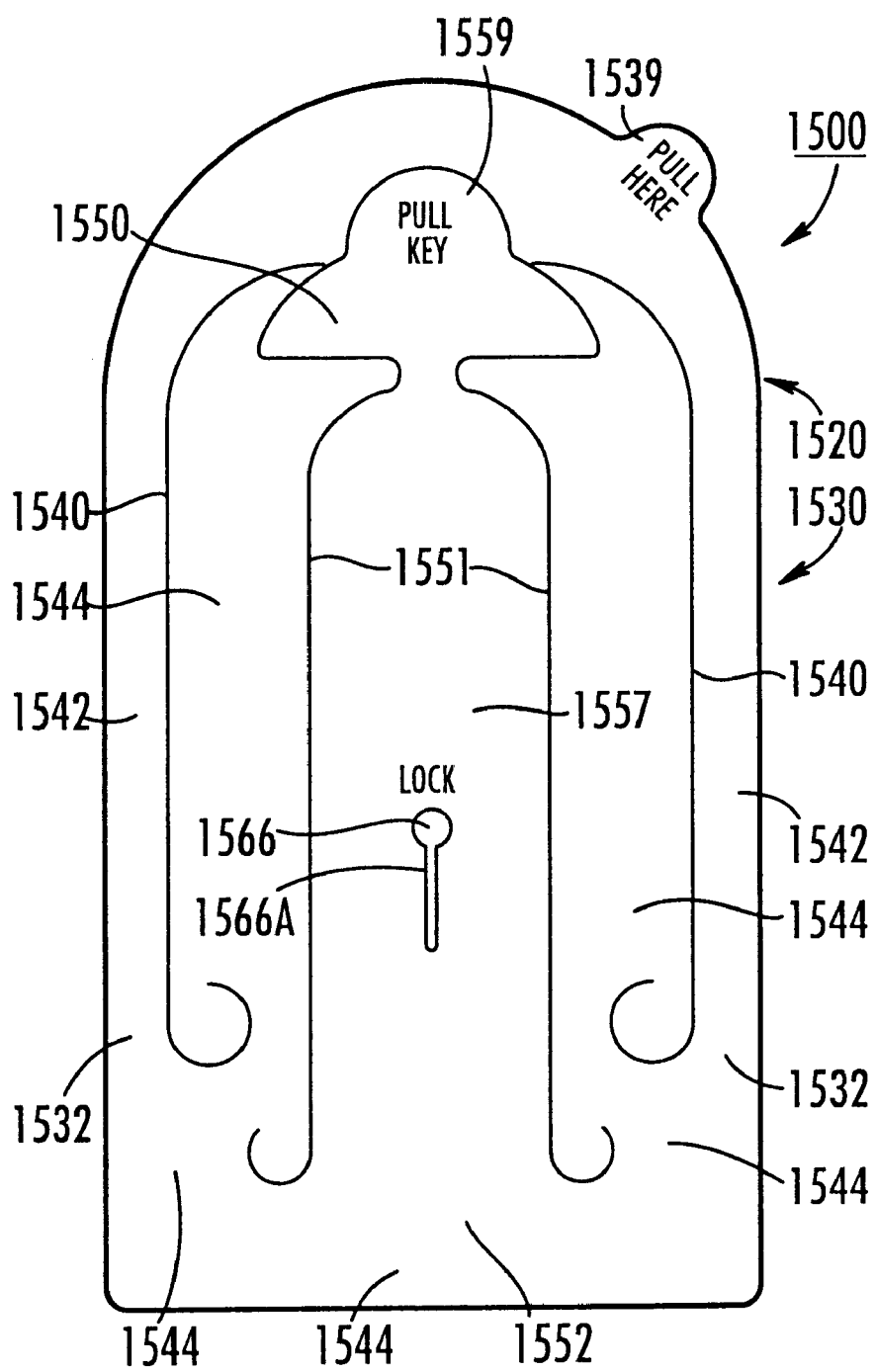
FIG. 47 is a top plan view of a label according to a further embodiment of the present invention.

With reference to FIG. 47, a label 1500 according to a further embodiment is shown therein. The label includes at least a suspension layer 1520. Cut lines 1540 in the layer 1520 define a hanger 1530 having opposed legs 1542 a pull tab 1539. Cut lines 1551 in the layer 1520 define a portion or interlock flap 1557 having an interlock tab 1550, which in turn includes a pull tab 1559. A cut line 1566A in the interlock flap 1557 defines a tab 1566. Anchoring portions 1544 form the remainder of the layer 1520.

The anchoring portions 1544 are coated on their rear surfaces by active adhesive (e.g., corresponding to the adhesive 110) and serve to secure the label 1500 to an associated article. The tab 1566 is also coated on its rear surface by active adhesive (not shown) so that the tab 1566 is secured to the article. The hanger 1530 and the remainder of the interlock flap 1557 are coated with deadened adhesive (not shown) or are not coated with adhesive so that the hanger may be folded about ends 1532 and the interlock flap 1557 may be folded about an end 1552.

The label 1500 may be a single ply label or a multiple ply label as described above. Suitable materials and methods for forming the label 1500 will be apparent to those of ordinary skill in the art upon reading the foregoing description. Additionally, the label 1500 may be modified to include various constructions and features as described with regard to the foregoing labels.

The label 1500 may be used as follows. The label 1500 may be secured to an article such that the adhesive thereof (not shown) secures the anchoring portions 1544 and the tab 1566 to the article. The user may then pull up the flap 1557 and fold it about the end 1552 using the tab 1559, loop the flap 1557 about a rod or other support, and insert the interlock tab 1550 through an opening in the flap 1557 formed when the tab 1566 remains secured to the article by the adhesive thereof. The interlock tab 1550 is then interlocked with the opening as described above. In this manner, a closed hanging loop is formed.

Alternatively, the user may lift the hanger 1530 using the pull tab 1539 and fold it about the ends 1532. An opening will then be formed within the cut lines 1540 through which a desired support may be inserted.

Any of the foregoing labels may include indicia as desired printed on the layers from which the hanger or base tab are formed. Such indicia may include product identification, instructions, warnings, lot data, expiration data, and bar codes.

If desired, small patches of adhesive may be provided on the undersides of the hangers and interlock tabs to temporarily secure these elements to the article or base layer, if present (the described release liner tabs on the pull tabs would be omitted). Such a adhesive patches would preferably be provided under the segment corners (e.g., the corners 137) and the pull tabs. Moreover, connecting ties may be formed in the hanger or suspension layer across the cut lines to hold the hanger down temporarily.

It is particularly contemplated that in each of the embodiments having only a single, hanger or suspension layer without a base layer means may be provided beneath the pull tab to temporarily secure the pull tab to the article surface. According to one method, a fugitive adhesive is applied to the underside of the pull tab. The fugitive adhesive adheres to the article surface when the label is applied to the article. However, when the pull tab is pulled up, the fugitive adhesive remains with the pull tab and becomes substantially non-tacky. According to another method, partially or selectively deadened adhesive is provided on the underside of the pull tab. The partially deadened adhesive temporarily holds the pull tab to the article, but is not unduly tacky when exposed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A label for suspending an article from a support, said label having a lower surface and comprising:
    a) an adhesive on said lower surface to secure said label to the article;
    b) a hanger defining a hanger opening therein;
    c) an interlock receiving portion having an interlock opening defined therein; and
    d) an interlock tab adapted to selectively engage said interlock opening to interlock with said interlock receiving portion to form a hanging loop.

2. The label of claim 1 releasably secured to a release liner by said adhesive.

3. The label of claim 1 wherein, when said label is mounted on the article, said hanger is movable between a stored position wherein said hanger is disposed adjacent the article and a hanging position wherein said hanger is folded away from the article.

4. The label of claim 1 wherein, when said label is mounted on the article, said interlock tab is movable between a stored position wherein said interlock tab is disposed adjacent the article and an interlocking position wherein said interlock tab is folded away from the article.

5. The label of claim 1 wherein said hanger and said interlock receiving portion are formed from cut lines in a unitary suspension layer.

6. The label of claim 1 including indicia disposed thereon.

7. The label of claim 1 wherein each of said hanger and said interlock receiving portion has a lower surface that is substantially free of adhesive.

8. The label of claim 1 wherein each of said hanger and said interlock receiving portion has a lower surface that is coated with a deadened adhesive.

9. The label of claim 1 wherein said interlock tab includes at least two opposed extensions adapted to engage said interlock opening.

10. The label of claim 1 wherein at least said hanger includes a plurality of layers adhered to one another.

11. The label of claim 1 including a support locating notch defined in said hanger and communicating with said hanger opening.

12. The label of claim 1 further comprising:
    a) first and second opposed label ends and an intermediate region disposed between and spaced apart from said first and second label ends; and
    b) an anchoring portion disposed adjacent said first label end and having a lower surface;
    c) wherein said adhesive is disposed on said lower surface of said anchoring portion;
    d) wherein said hanger includes:
        at least one primary leg having a leg end adjoining said anchoring portion and extending toward said second label end, said at least one primary leg defining said hanger opening and being foldable about said leg end; and
        a pair of opposed secondary legs each having a leg end adjacent said intermediate region and extending toward said second label end, said secondary legs defining a secondary opening therebetween;
    e) wherein said interlock receiving portion includes an interlock flap forming a part of said hanger and disposed within said secondary opening, said interlock flap being foldable about a flap end adjacent said intermediate region and including said interlock opening defined therein adjacent said second label end;
    f) wherein said interlock tab is integral with said secondary legs; and
    g) wherein said hanging loop includes said interlock flap and said secondary legs.

13. The label of claim 12 wherein said at least one primary leg includes a pair of opposed said primary legs foldable about respective said leg ends and defining said hanger opening therebetween.

14. The label of claim 1 further comprising:
    a) first and second opposed label ends and an intermediate region disposed between and spaced apart from said first and second label ends; and
    b) an anchoring portion disposed adjacent said first label end and having a lower surface;
    c) wherein said adhesive is disposed on said lower surface of said anchoring portion;
    d) wherein said hanger includes:
        at least one primary leg having a leg end adjoining said anchoring portion and extending toward said second label end, said at least one primary leg defining said hanger opening and being foldable about said leg end; and
        a pair of opposed secondary legs each having a leg end adjacent said intermediate region and extending toward said second label end, said secondary legs defining a secondary opening therebetween;
    e) wherein said interlock receiving portion includes an interlock flap forming a part of said hanger and disposed within said secondary opening, said interlock flap being foldable about a flap end adjacent said second label end and including said interlock opening defined therein adjacent said intermediate region;

f) wherein said interlock tab is integral with said secondary legs; and g) wherein said hanging loop includes said interlock flap.

15. The label of claim 14 wherein said at least one primary leg includes a pair of opposed said primary legs foldable about respective said leg ends and defining said hanger opening therebetween.

16. The label of claim 1 further comprising:

a) first and second opposed label ends; and b) an anchoring portion disposed adjacent said first label end and having a lower surface;

c) wherein said adhesive is disposed on said lower surface of said anchoring portion;

d) wherein said hanger includes at least one primary leg having a leg end adjoining said anchoring portion and extending toward said second label end, said at least one primary leg defining said hanger opening and being foldable about said leg end;

e) wherein said interlock receiving portion includes a body portion forming a part of said hanger and disposed between said primary opening and said second label end, said body portion including said interlock opening defined therein and spaced apart from said second label end;

f) wherein said interlock tab is integral with said body portion; and g) wherein said hanging loop includes said body portion.

17. The label of claim 16 wherein said at least one primary leg includes a pair of opposed said primary legs foldable about respective said leg ends and defining said hanger opening therebetween.

18. The label of claim 1 further comprising:

a) first and second opposed label ends and an intermediate region disposed between and spaced apart from said first and second label ends; and b) an anchoring portion disposed adjacent said first label end and having a lower surface;

c) wherein said adhesive is disposed on said lower surface of said anchoring portion;

d) wherein said hanger includes:

at least one primary leg having a leg end adjoining said anchoring portion and extending toward said second label end, said at least one primary leg defining said hanger opening and being foldable about said leg end; and a pair of opposed secondary legs each having a leg end adjacent said intermediate region and extending toward said second label end, said secondary legs defining a secondary opening therebetween, said connecting portion being disposed between said primary and secondary openings;

e) wherein said interlock receiving portion includes a connecting portion forming a part of said hanger and connecting said primary legs, said connecting portion disposed adjacent said intermediate region and including said interlock opening defined therein;

f) wherein said interlock tab is integral with said secondary legs; and g) wherein said hanging loop includes said connecting portion and said secondary legs.

19. The label of claim 18 wherein said at least one primary leg includes a pair of opposed said primary legs foldable about respective said leg ends and defining said hanger opening therebetween.

20. The label of claim 1 further comprising:

a) first and second opposed label ends; and b) an anchoring portion having a lower surface;

c) wherein said adhesive is disposed on said lower surface of said anchoring portion;

d) wherein said hanger includes a pair of opposed legs each having a leg end adjoining said anchoring portion and extending between said first and second label ends, said legs defining said hanger opening therebetween and being foldable about said respective leg ends;

e) wherein said interlock receiving portion includes an interlock flap disposed between said legs, said interlock flap having a first flap end adjoining said anchoring portion and an opposing second, free flap end, said interlock flap including said interlock opening defined therein and spaced apart from said second flap end;

f) wherein said interlock tab is integral with said interlock flap and located on said second flap end;

g) wherein said hanging loop includes said interlock flap.

21. The label of claim 20 wherein said first end of said interlock flap is disposed adjacent said first label end.

22. A suspendable assembly comprising:

a) an article; and b) a label having a lower surface and comprising:

an adhesive on said lower surface securing said label to said article;

a hanger defining a hanger opening therein;

an interlock receiving portion having an interlock opening defined therein; and an interlock tab adapted to selectively engage said interlock opening to interlock with said interlock receiving portion to form a hanging loop.

23. A method for suspending an article from a support, said method comprising the steps of:

providing a label secured to the article by an adhesive, the label including:

a hanger defining a hanger opening therein;

an interlock receiving portion having an interlock opening defined therein; and an interlock tab; and interlocking the interlock tab with the interlock opening to form a closed hanging loop extending about the support and to the article.

* * * * *